(12) United States Patent
Lau et al.

(10) Patent No.: US 11,423,376 B2
(45) Date of Patent: Aug. 23, 2022

(54) SYSTEM AND METHOD FOR AUTO-POPULATING ELECTRONIC TRANSACTION PROCESS

(71) Applicant: ROYAL BANK OF CANADA, Toronto (CA)

(72) Inventors: Alex Tak Kwun Lau, Toronto (CA); Arup Saha, Toronto (CA); Hareshkumar Chaudhari, Toronto (CA); Izayana Navas, Toronto (CA); Rami Thabet, Toronto (CA); Kristopher Hanks, Toronto (CA); Nijan Giree, Toronto (CA)

(73) Assignee: Royal Bank of Canada, Toronto (CA)

( * ) Notice: Subject to any disclaimer, the term of this patent is extended or adjusted under 35 U.S.C. 154(b) by 350 days.

(21) Appl. No.: 16/671,953

(22) Filed: Nov. 1, 2019

(65) Prior Publication Data

US 2020/0143349 A1    May 7, 2020

Related U.S. Application Data

(60) Provisional application No. 62/820,567, filed on Mar. 19, 2019, provisional application No. 62/755,043, filed on Nov. 2, 2018.

(51) Int. Cl.
*G06Q 20/14* (2012.01)
*G06K 9/62* (2022.01)
(Continued)

(52) U.S. Cl.
CPC ........... *G06Q 20/14* (2013.01); *G06F 40/174* (2020.01); *G06K 9/6256* (2013.01);
(Continued)

(58) Field of Classification Search
USPC .................................................... 705/35, 39
See application file for complete search history.

(56) References Cited

U.S. PATENT DOCUMENTS

| 6,438,527 | B1 * | 8/2002 | Powar | G06Q 20/02 |
| | | | | 705/40 |
| 8,311,942 | B1 * | 11/2012 | Mason | G06Q 10/10 |
| | | | | 705/40 |
| 2015/0332228 | A1 * | 11/2015 | Kimberg | G06Q 20/102 |
| | | | | 705/40 |

OTHER PUBLICATIONS https://en.wikipedia.org/wiki/Feature_hashing, Wikipedia, Feature hashing, 5 pages.

(Continued)

*Primary Examiner* — William E Rankins
(74) *Attorney, Agent, or Firm* — Norton Rose Fulbright Canada LLP

(57) ABSTRACT

A system and method for auto-populating an electronic transaction process is provided. The system comprises at least one processor, and a memory storing instructions which when executed by the at least one processor configure the processor to obtain a scanned payee identifier from an optical character recognition scan of a digital bill document, compare the scanned payee identifier with a set of stored payee identifiers to obtain at least one first identifier match, determine a score for each of the at least one identifier match, and select the stored payee identifier associated with a highest score. The method comprises obtaining a scanned payee identifier from an optical character recognition scan of a digital bill document, comparing the scanned payee identifier with a set of stored payee identifiers to obtain at least one first identifier match, determining a score for each of the at least one identifier match, and selecting the stored payee identifier associated with a highest score.

17 Claims, 24 Drawing Sheets

(51) Int. Cl.
  *G06F 40/174* (2020.01)
  *G06V 30/412* (2022.01)
  *G06V 30/416* (2022.01)
  *G06V 30/10* (2022.01)

(52) U.S. Cl.
  CPC ......... *G06K 9/6265* (2013.01); *G06V 30/412* (2022.01); *G06V 30/416* (2022.01); *G06V 30/10* (2022.01)

(56) References Cited

OTHER PUBLICATIONS https://keras.io/preprocessing/text/, Keras Documentation, Text Pre-processing, 3 pages.
https://en.wikipedia.org/wiki/Data_binning, Wikipedia, Data binning, 2 pages.
https://cloud.google.com/vision/docs, Google's Cloud Vision API, Cloud Vision documentation, 2 pages.
https://firebase.google.com/docs/ml-kit/recognize-text, Google's MLKit—On Device Text Recognizer, Text Recognition, 9 pages.
Jiang, Bin (2013). "Head/tail breaks: A new classification scheme for data with a heavy-tailed distribution", The Professional Geographer, 65 (3), 482-494.

* cited by examiner

SYSTEM AND METHOD FOR AUTO-POPULATING ELECTRONIC TRANSACTION PROCESS

CROSS REFERENCE TO RELATED APPLICATIONS

This application is a non-provisional of, and claims all benefit, including priority to, U.S. Application No. 62/755,043, dated Nov. 2, 2018; and U.S. Application No. 62/820,567, dated Mar. 19, 2019, both entitled SYSTEM AND METHOD FOR AUTO-POPULATING ELECTRONIC TRANSACTION PROCESS, and both incorporated herein in their entirety by reference.

FIELD

The present disclosure generally relates to the field of digital transaction payments, and in particular to a system and method for auto-populating an electronic transaction process.

INTRODUCTION

Electronic bill payment is a flagship feature for many online and mobile banking applications in large financial institutions all over the world. Although the user experience for completing a bill payment varies from financial institution (FI) to FI, they all require the user to provide information identifying the biller (i.e., payee) and an unique identifier of the customer's account (i.e., account number) in order to complete the payment process. The complex demand for the user to manually parse a bill (either in an electronic form such as a portable document format (PDF), or in printed form on paper) and enter the parsed information into a form-based user interface is a major source of error and frustration.

SUMMARY

In accordance with an aspect, there is provided a system for auto-populating an electronic transaction process. The system comprises at least one processor, and a memory storing instructions which when executed by the at least one processor configure the processor to obtain a scanned payee identifier from an optical character recognition scan of a digital bill document, compare the scanned payee identifier with a set of stored payee identifiers to obtain at least one first identifier match, determine a score for each of the at least one identifier match, and select the stored payee identifier associated with a highest score.

In accordance with another aspect, there is provided a method of auto-populating an electronic transaction process. The method comprises obtaining a scanned payee identifier from an optical character recognition scan of a digital bill document, comparing the scanned payee identifier with a set of stored payee identifiers to obtain at least one first identifier match, determining a score for each of the at least one identifier match, and selecting the stored payee identifier associated with a highest score.

In accordance with another aspect, there is provided a non-transitory computer-readable storage medium comprising computer-executable instructions, which when executed by a processor cause the processor to perform a method of auto-populating an electronic transaction process. The method comprises obtaining a scanned payee identifier from an optical character recognition scan of a digital bill document, comparing the scanned payee identifier with a set of stored payee identifiers to obtain at least one first identifier match, determining a score for each of the at least one identifier match, and selecting the stored payee identifier associated with a highest score.

In accordance with another aspect, there is provided a system for auto-populating an electronic transaction process. The method comprises at least one processor, and a memory storing instructions which when executed by the at least one processor configure the processor to obtain a plurality of scanned payee identifiers from an optical character recognition scan of a digital bill document, determine an identifier type for each of the plurality of scanned payee identifiers, compare each scanned payee identifier with a corresponding set of stored payee identifiers to obtain at least one identifier type match, determine an identifier type match score for each of the at least one identifier type match, determine an overall score based on each identifier type match score, and select the stored payee identifier associated with a highest overall score. The corresponding set of stored payee identifiers comprise stored payee identifiers of the identifier type for that scanned payee identifier.

In accordance with another aspect, there is provided a method of auto-populating an electronic transaction process. The method comprises obtaining a plurality of scanned payee identifiers from an optical character recognition scan of a digital bill document, determining an identifier type for each of the plurality of scanned payee identifiers, comparing each scanned payee identifier with a corresponding set of stored payee identifiers to obtain at least one identifier type match, determining an identifier type match score for each of the at least one identifier type match, determining an overall score based on each identifier type match score, and selecting the stored payee identifier associated with a highest overall score. The corresponding set of stored payee identifiers comprise stored payee identifiers of the identifier type for that scanned payee identifier.

In accordance with another aspect, there is provided a non-transitory computer-readable storage medium comprising computer-executable instructions, which when executed by a processor cause the processor to perform a method of auto-populating an electronic transaction process. The method comprises obtaining a plurality of scanned payee identifiers from an optical character recognition scan of a digital bill document, determining an identifier type for each of the plurality of scanned payee identifiers, comparing each scanned payee identifier with a corresponding set of stored payee identifiers to obtain at least one identifier type match, determining an identifier type match score for each of the at least one identifier type match, determining an overall score based on each identifier type match score, and selecting the stored payee identifier associated with a highest overall score. The corresponding set of stored payee identifiers comprises stored payee identifiers of the identifier type for that scanned payee identifier.

In accordance with another aspect, there is provided a payee name detection system. The payee name detection system comprises at least one input component, at least one matching service, at least one database comprising a reverse multimap database, at least one scoring engine, and at least one output component. The at least one input component comprising at least one of a scanner, a camera, an optical character recognition (OCR) engine, an image file, or a component that may receive and read the image file. The at least one matching service comprising a text matching service, or a text matching unit. The at least one of a text matching service comprising at least one of a postal code matcher service, a post office (PO) box matcher service, a uniform resource locator (URL) matcher service, or a logo detection service. The at least one of a text matching unit comprising at least one of a postal code matcher unit, a post office (PO) box matcher unit, a uniform resource locator (URL) matcher unit, or a logo detection unit. The at least one output component comprising at least one of a display, a document, or an electronic transmission.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings. Embodiments described herein relate to natural language processing, including natural language understanding, speech recognition, natural-language generation, and so on.

In some embodiments, optical character recognition (OCR) may be leveraged as the basis to auto-fill input fields that are required to complete a typical bill payment process. A method may be set to extract the payee and account number from a bill that is either electronic in nature (e.g., PDF) or on printed media (e.g., paper bills).

A popular approach to alleviating errors and user frustration is use OCR to "auto-fill" the required input fields a bill payment process is an enhancement to an electronic bill payment process. In such existing solutions, an OCR component and a set of pattern matchers (e.g., Regular expressions) are used to extract a feature from the document. For example, a particular solution might use the regular expression

"((^(?!.*[DFIOQU])[A-VXY][0-9][A-Z])?([0-9][A-Z][0-9]))"

to match a postal code on a paper bill. Once the particular feature (in this example, postal code) is extracted, a lookup is typically done against an association database where the payee name (e.g., Rogers Communication) is associated against the extracted feature (e.g., L4G 9X8). However, the feature extracted by the OCR component might be of poor quality, or the document used for OCR extraction lacks the feature targeted by the pattern matchers (for example, e-bills typically lack the postal code).

There has also been efforts to use cloud based Logo-Detection services to aid in the event that OCR fails to extract the necessary features. Such efforts may prompt privacy concerns since the model is typically hosted by the vendor and thus the image is also sent to the vendor for processing.

Figure 1A:
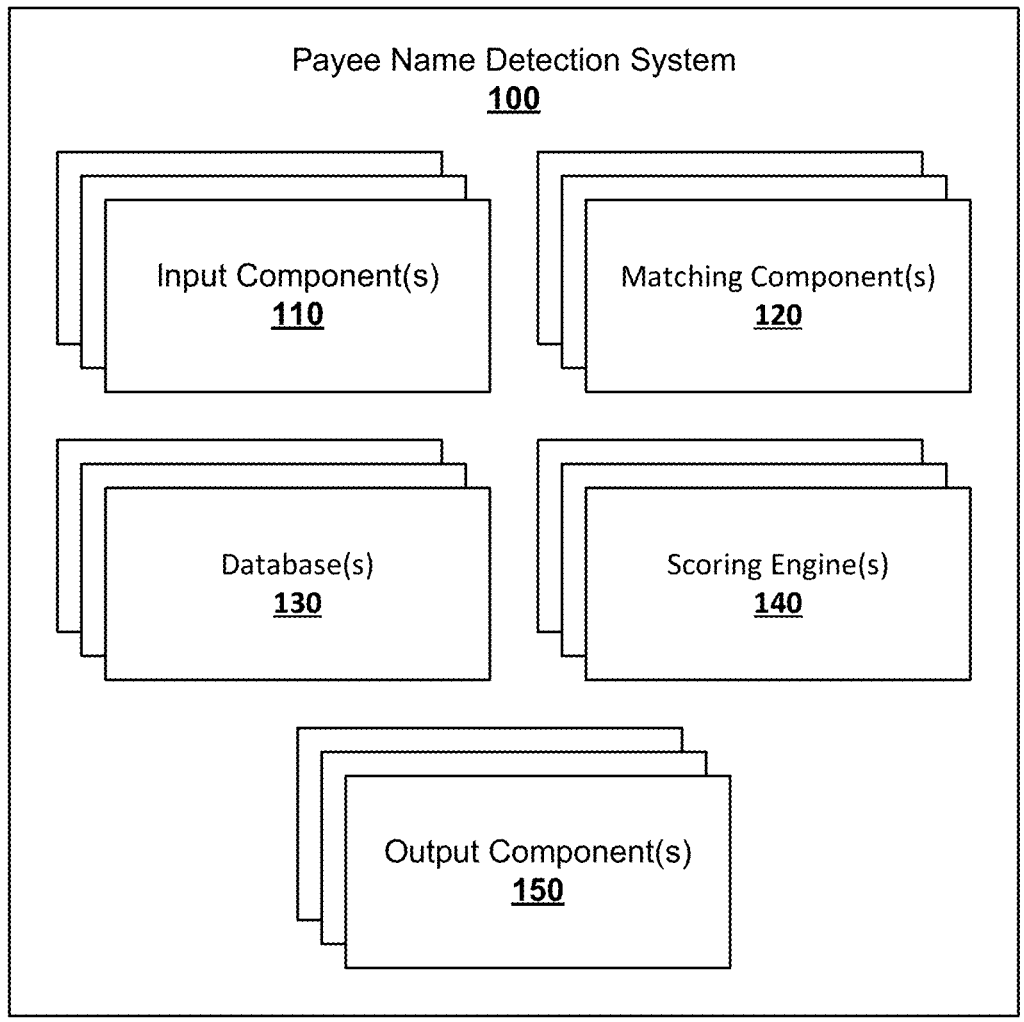
FIG. 1A illustrates, in a component diagram, an example of a payee name detection system, in accordance with some embodiments.

FIG. 1A illustrates, in a schematic diagram, an example of a payee name detection system 100, in accordance with some embodiments. The payee name detection system 100 comprises at least one input component 110, at least one matching service 120, at least one database 130, at least one scoring engine 140, and/or at least one output component 150.

In some embodiments, the at least one input component 110 may comprise at least one of scanner, camera, optical character recognition (OCR) engine or other input apparatus that may obtain an image file of a transaction invoice. In some embodiments, the at least one input component 110 may comprise the image file itself, or a component that may receive and read the image file.

In some embodiments, the at least one matching service 120 may comprise at least one of a text matching service or text matching unit. The text matching service or unit may comprise a postal code matcher service or unit, a post office (PO) box matcher service or unit, a uniform resource locator (URL) matcher service or unit, and/or a logo detection service or unit. Examples of these components are described in more detail below. In some embodiments, the 'services' may comprise Java services.

In some embodiments, the at least one database 130 may comprise a reverse multi-map database. In some embodiments, at least one of the database(s) 130 may be in a virtual machine.

In some embodiments, leveraging a scoring engine 140, so that multiple features are extracted and matched against a "reverse multi-map" database is employed. In such a database, the key itself is multi-valued and may comprise features such as postal code, PO Box, URL, and account number formats. The value may be the payee name which has these features.

In some embodiments, the at least one output component 150 may comprise at least one of a display, a document, an electronic transmission, or other output of the payee name.

Is some embodiments, a set of matching rules for bills in electronic and printed format is employed. These set of matching rules span features that helps a matching method identify both the payee name and the user's account number.

In some embodiments, a technique to do "Logo Detection" without leveraging cloud based deep neural networks (DNNs) may be used. Such a technique leverages OCR, where the DNN models are highly optimized and yield accuracy even when executed on a mobile device. In some embodiments, the technique leverages unsupervised clustering, specifically k-means, to search for textual candidates that are part of the payee's logo on an electronic or printed bill. In other embodiments, the technique leverages long tail data clustering, specifically head/tails breaks, to search for textual candidates that are part of the payee's logo on a electronic or printed bill. In both type of embodiments, these candidates are subsequently searched against a database (such as an association database) and fed into a scoring engine for evaluation.

In some embodiments, a method of collecting labelled data, use these labelled data to train an artificial neural network (ANN), and eventually use the trained neural network to provide input into the scoring engine to further improve its accuracy is provided.

Figure 1B:
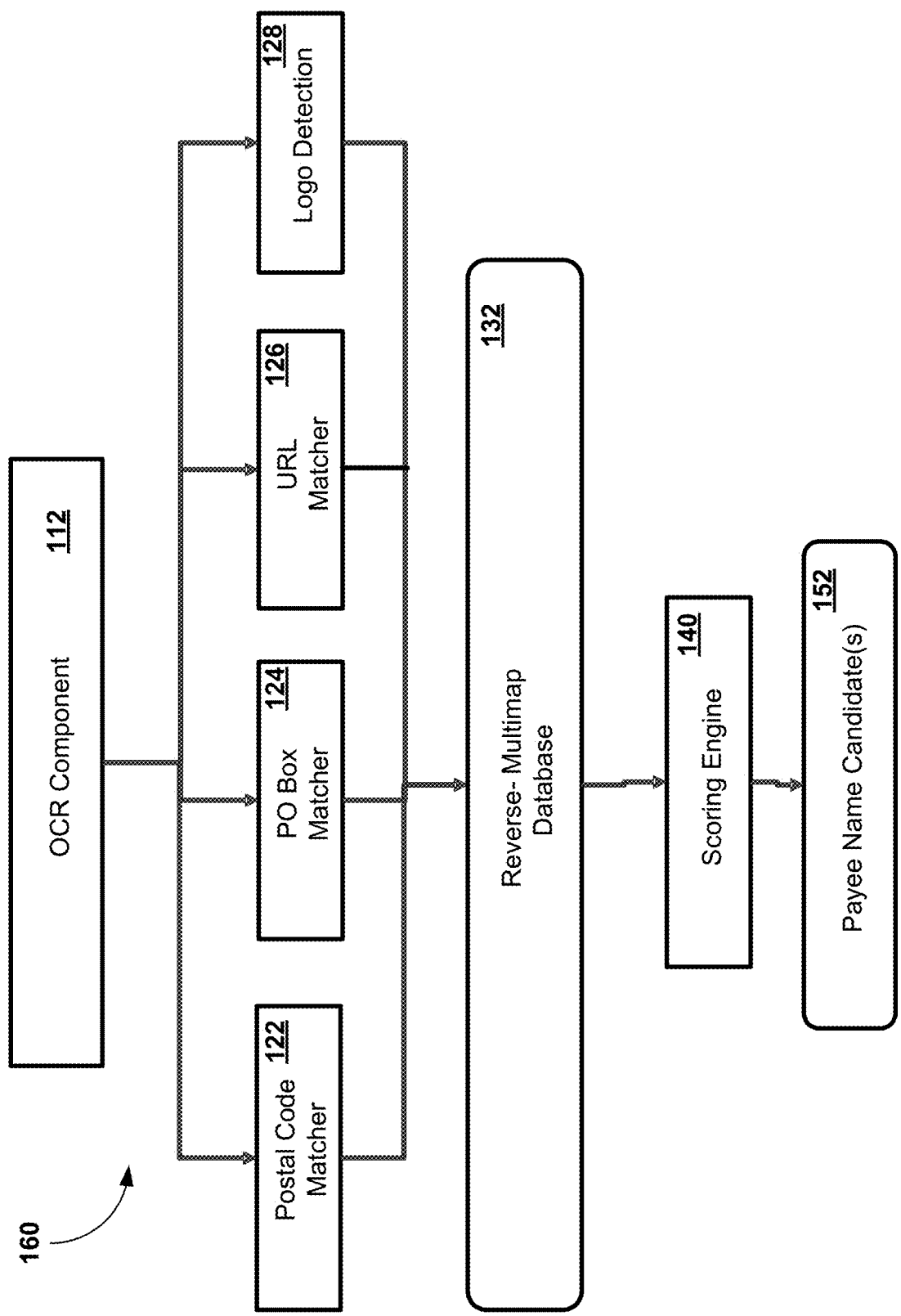
FIG. 1B illustrates, in a component diagram, another example of a payee name detection system, in accordance with some embodiments.

FIG. 1B illustrates, in a component diagram, an example of a payee name detection system 160, in accordance with some embodiments. The payee name detection system 160 comprises an OCR component 112, at least one text matching unit 121, a reverse multi-map database 132, a scoring engine 140, and a payee name candidate determination unit 152. Other components may be added to the payee name detection system 160.

The OCR component 112 may comprise an OCR engine, including but not limited to engines powered by a variation of a convolutional neural network (CNN) that is able to run on a mobile device. One such example is Google's MLKit and its on device text recognizer. The input of the OCR component 112 may comprise an image of the electronic or paper bill. The output of the OCR component 112 may comprise a list of text blocks, where text blocks are defined as blocks of text that are grouped together because they are logically related (but are not bounded by physical locality). Furthermore, a text block may comprise zero or more line objects. Each line object may comprise zero or more element objects, which represent words. In some embodiments, a text block may comprise the entire address of a payee, even if it spans multiple lines.

The at least one text matching unit 121 may comprise at least one of a postal code matcher unit 122, a post office (PO) box matcher unit 124, a uniform resource locator (URL) matcher unit 126, and a logo detection unit 128.

The postal code matcher unit 122 may comprise a memory that stores instructions that when executed by a processor cause the processor to perform a method that takes as an input a list of text blocks from the OCR component 110, applies a set of logic to the blocks, and outputs a set of company name candidates that is searched against a database of payees (such as an association database) for matches.

Figure 1C:
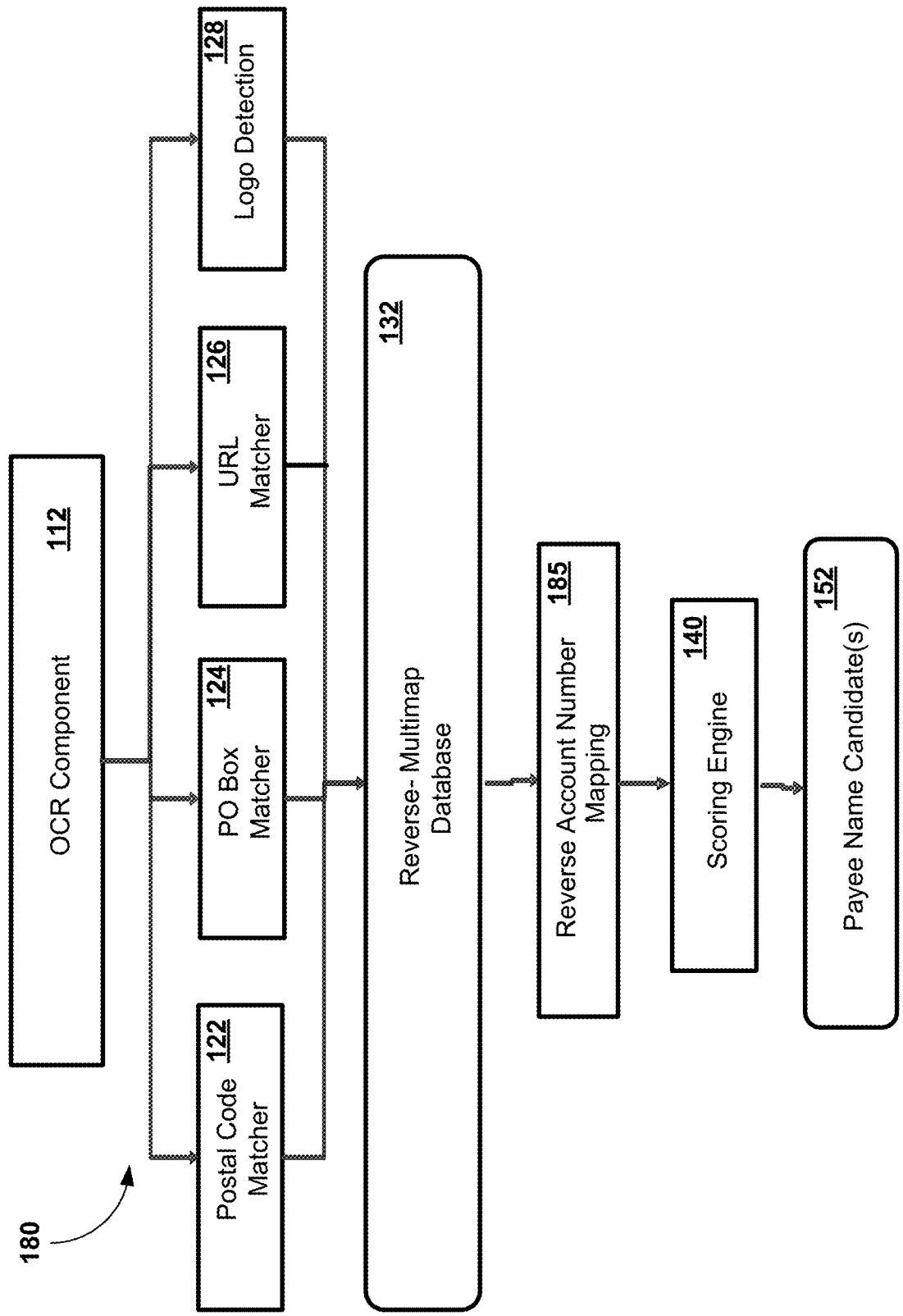
FIG. 1C illustrates, in a component diagram, another example of a payee name detection system, in accordance with some embodiments.

FIG. 1C illustrates, in a component diagram, another example of a payee name detection system 180, in accordance with some embodiments. FIG. 1C includes the elements in FIG. 1B as well as a reverse account number mapping unit 185 which will be described further below.

Figure 2:
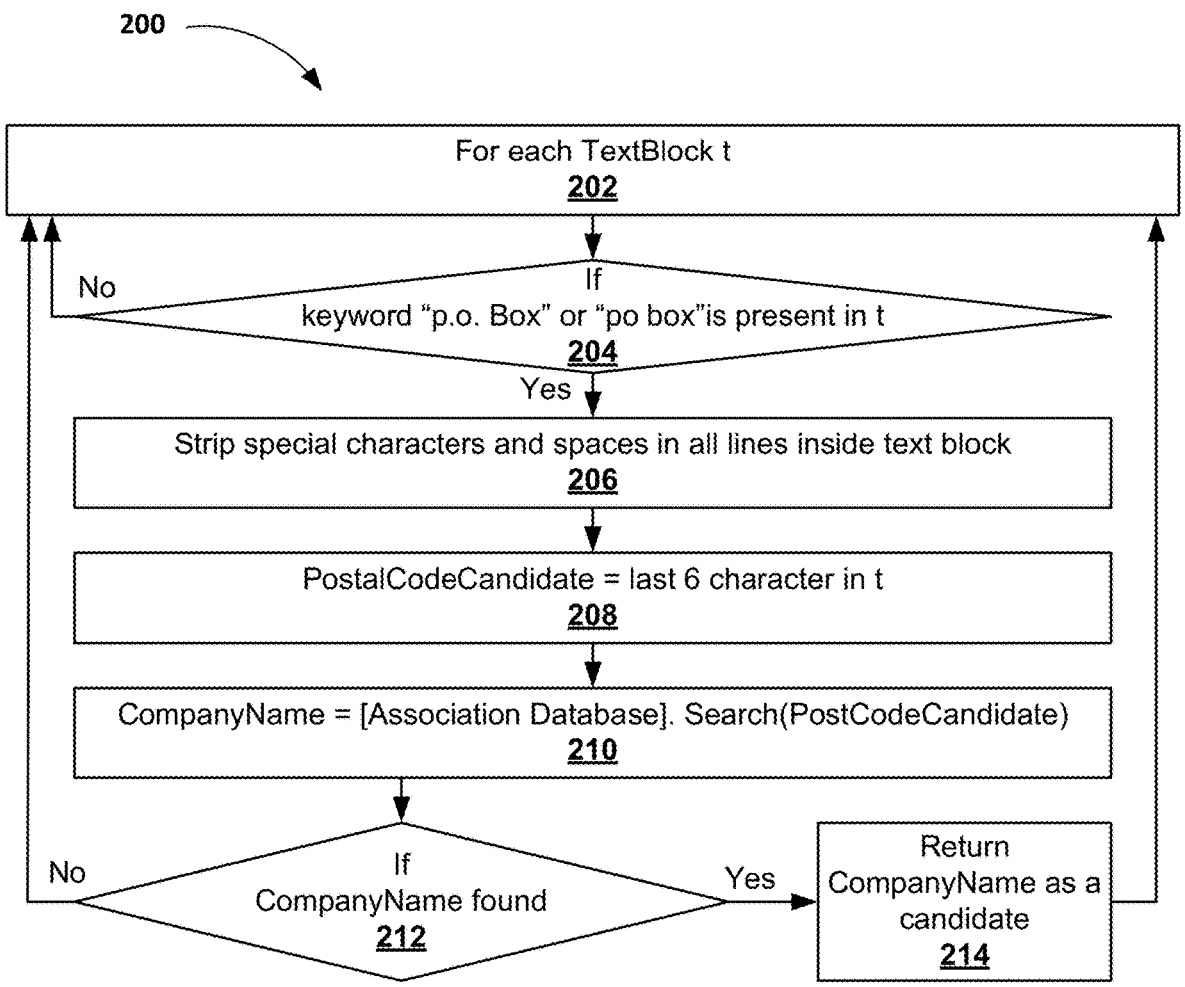
FIG. 2 illustrates, in a flowchart, an example of a method of matching a postal code text, in accordance with some embodiments.

FIG. 2 illustrates, in a flowchart, an example of a method 200 of matching a postal code text, in accordance with some embodiments. The method 200 comprises:

```
For each TextBlock t { (202)
    if keyword "p.o. Box" or "po box" is present in t { (204)
    Strip special characters and spaces in all lines inside text block (206)
    PostalCodeCandidate = last 6 character in t (208)
    CompanyName = [Association Database].search (PostCodeCandidate) (210)
    if CompanyName found { (212)
        return CompanyName as a candidate (214)
    }
    }
}
```

It is understood that other variations of "P", "O", and "Box" may be applied in step 204.

The PO box matcher unit 124 may comprise a memory that stores instructions that when executed by a processor cause the processor to perform a method that takes as an input a list of text blocks from the OCR component 112, applies a set of logic to the blocks and outputs a set of company name candidates that is searched against the database of payees (i.e., association database) for matches.

Figure 3:
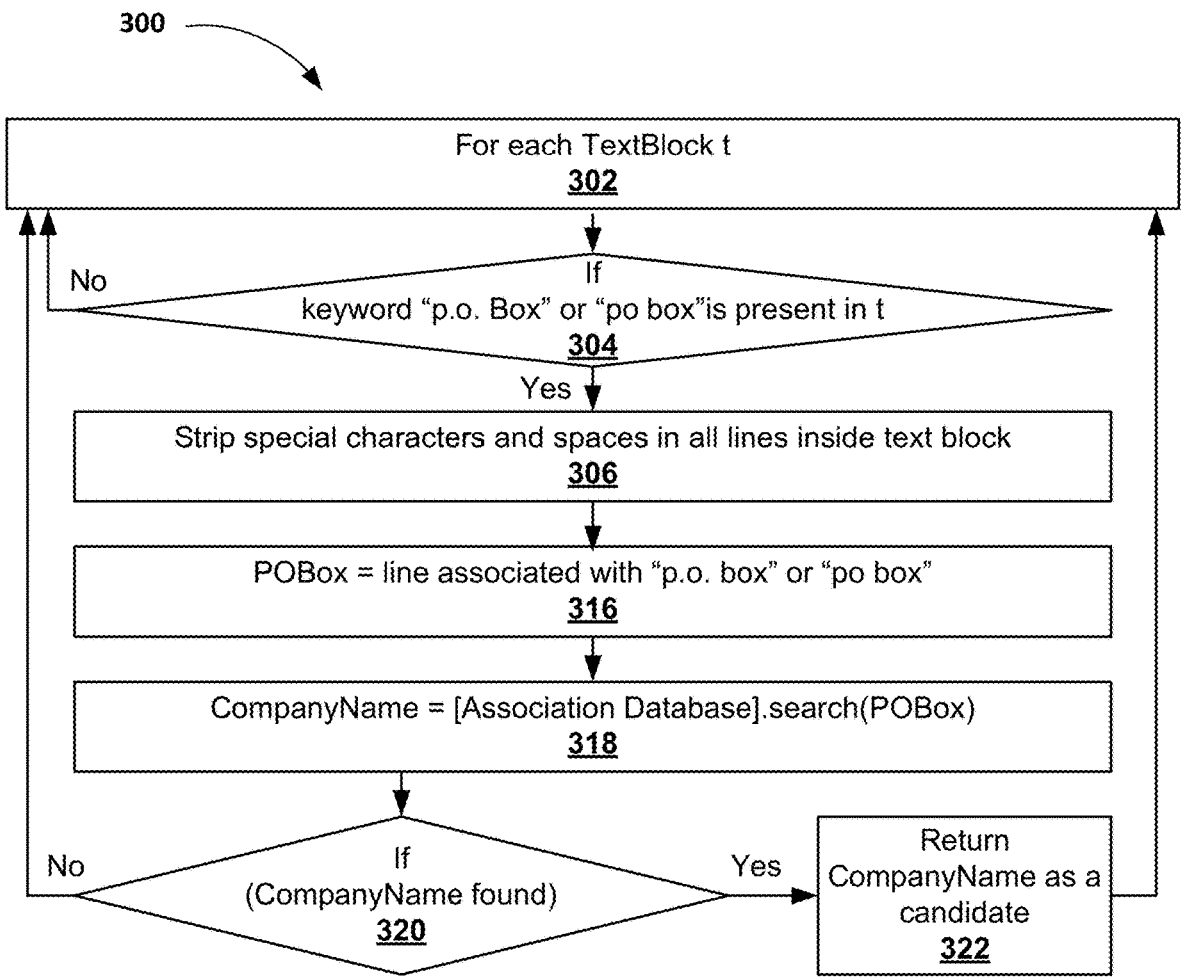
FIG. 3 illustrates, in a flowchart, an example of a method of matching a postal code text, in accordance with some embodiments.

FIG. 3 illustrates, in a flowchart, an example of a method 300 of matching a postal code text, in accordance with some embodiments. The method 300 comprises:

```
For each TextBlock t { (302)
    if keyword "p.o. Box" or "po box" is present in t { (304)
        Strip special characters and spaces in all lines inside text block (306)
        POBox = line associated with "p.o box" or "po box" (308)
        CompanyName = [Association Database].search(POBox) (310)
        if (CompanyName found) { (312)
            return CompanyName as a candidate (314)
        }
    }
}
```

It is understood that other variations of "P", "O", and "Box" may be applied in step 304.

In some embodiments, the PO box matcher unit 124 may work in conjunction with the postal code matcher unit 122. For example, the postal code matcher unit 122 may operate in combination with the PO box matcher unit 124, where the PO box matcher unit 124 is executed if the postal code matcher unit 122 is unable to find a match candidate.

Figure 4:
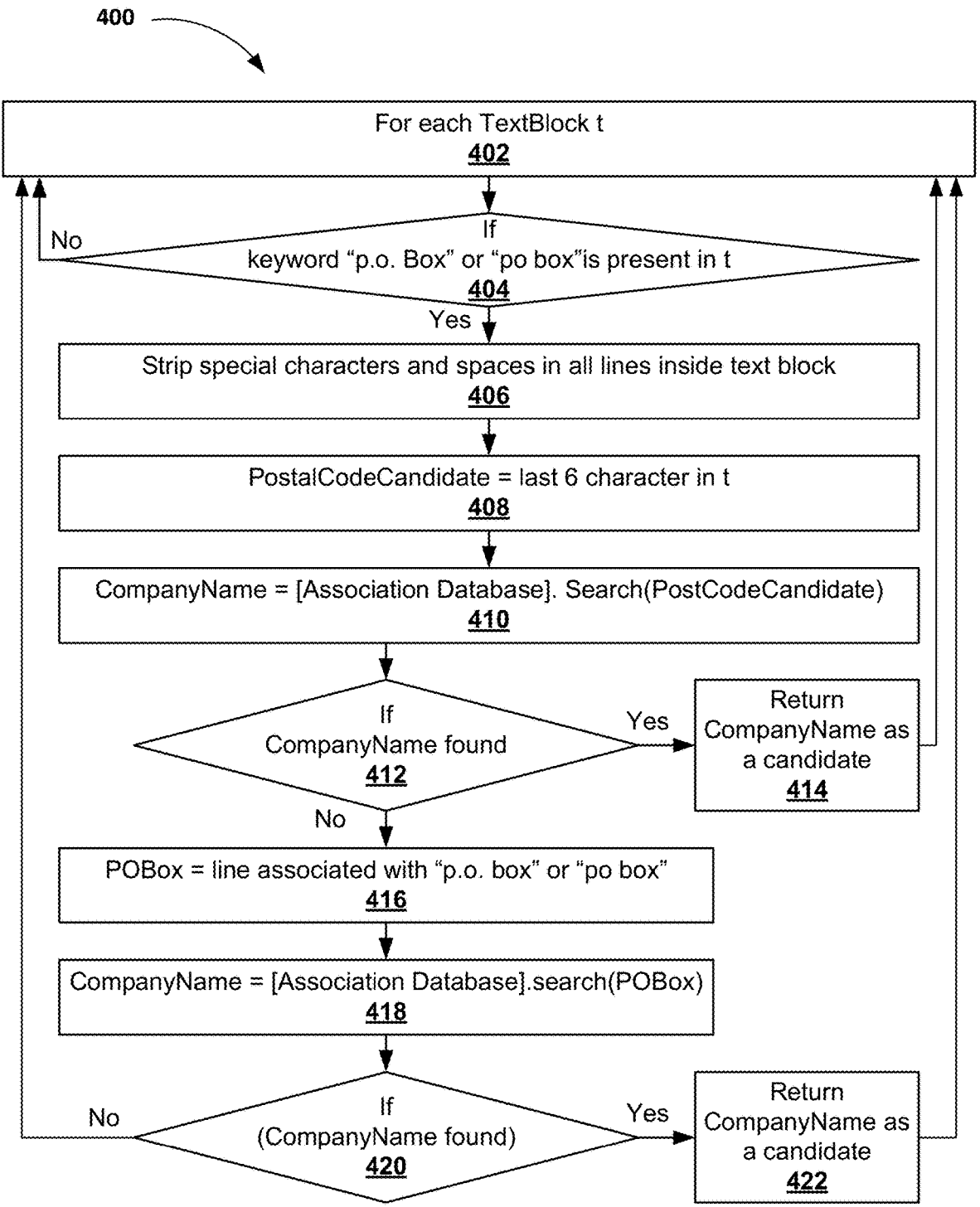
FIG. 4 illustrates, in a flowchart, an example of a method of matching a postal code text, in accordance with some embodiments.

FIG. 4 illustrates, in a flowchart, an example of a method 400 of matching a postal code text, in accordance with some embodiments. The method 400 comprises:

```
For each TextBlock t { (402)
    if keyword "p.o. Box" or "po box" is present in t { (404)
        Strip special characters and spaces in all lines inside text block (406)
        PostalCodeCandidate = last 6 character in t (408)
        CompanyName = [Association Database].search(PostCodeCandidate) (410)
        if CompanyName found { (412)
            return CompanyName as a candidate (414)
        } else {
            POBox = line associated with "p.o box" or "po box" (416)
            CompanyName = [Association Database].search(POBox) (418)
            if (CompanyName found) { (420)
                return CompanyName as a candidate (422)
            }
        }
    }
}
```

It is understood that other variations of "P", "O", and "Box" may be applied in step 404.

The URL matcher unit 126 may comprise a memory that stores instructions that when executed by a processor cause the processor to perform a method that takes as an input a list of text blocks from the OCR component 112, applies a set of logic to the blocks and outputs a set of company name candidates that is searched against the payee database (i.e., association database) for matches.

Figure 5:
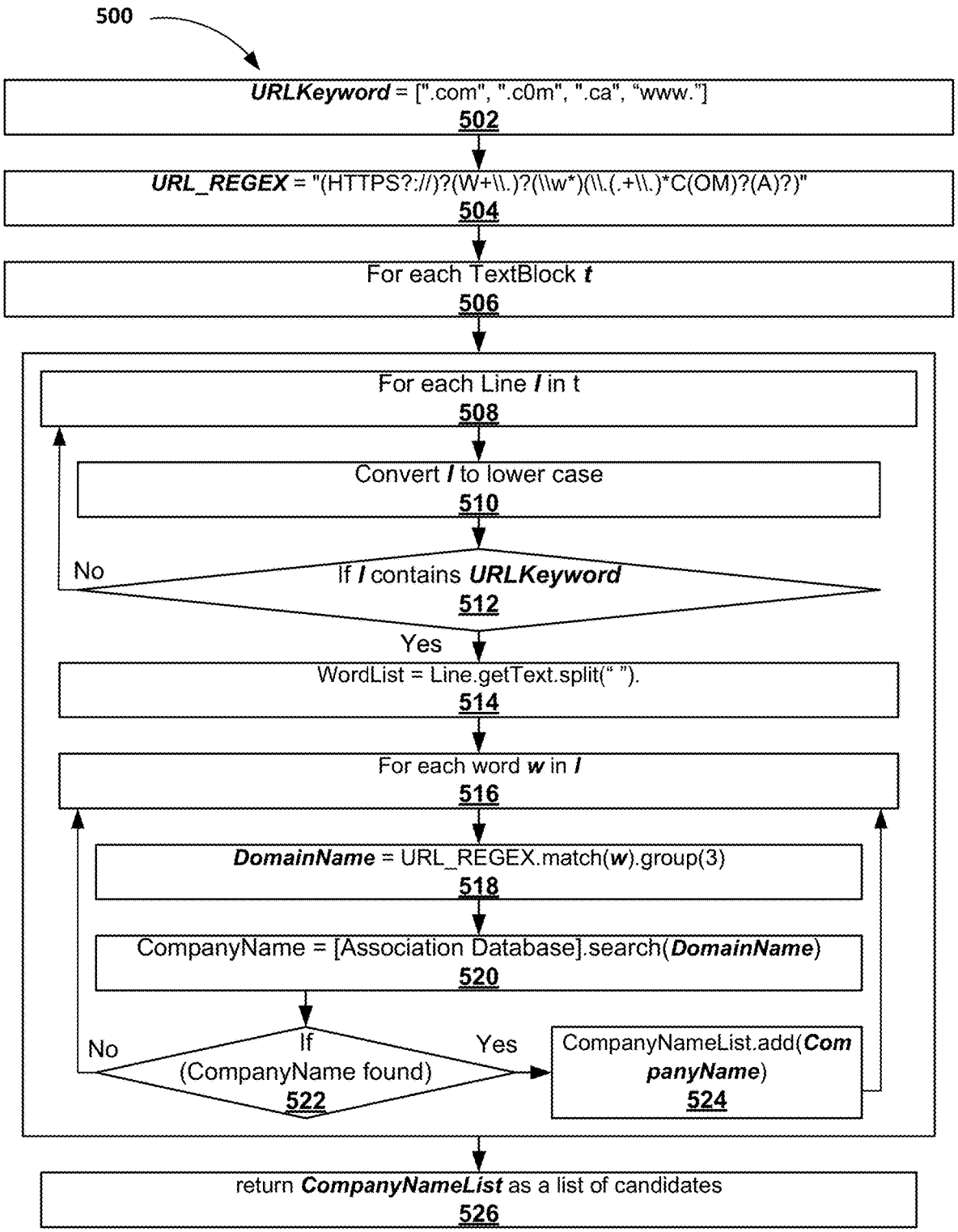
FIG. 5 illustrates, in a flowchart, an example of a method of matching a URL text, in accordance with some embodiments.

FIG. 5 illustrates, in a flowchart, an example of a method 500 of matching a URL text, in accordance with some embodiments. The method 500 comprises:

```
URLKeyword = [".com", ".c0m", ".ca", "www."] (502)
URL_REGEX= "(HTTPS?://)?(W+\\.)?(\\w*)(\\.(.+\\.)*C(OM)?(A)?)" (504)
For each TextBlock t { (506)
    For each Line l in t { (508)
        Convert l to lower case (510)
        if l contains URLKeyword { (512)
            WordList = Line.getText.split(" "). (514)
            For each Word w in l { (516)
                //Apply URL_REGEX to word w, extracting group 3 as the DomainName
                DomainName = URL_REGEX.match(w).group(3) (518)
                CompanyName= [Association Database].search(DomainName) (520)
                if CompanyName found { (522)
                    CompanyNameList.add(CompanyName) (524)
                }
            }
        }
    }
    return CompanyNameList as a list of candidates (526)
}
```

In some embodiments, the logo detection unit 128 may comprise a memory that stores instructions that when executed by a processor cause the processor to perform a method that takes as an input a list of text blocks from the OCR component 112, tokenizes the blocks into lines and clusters them using k-means. The method outputs a set of company name candidates that are searched against the payee database (i.e., association database) for matches.

may be used as seeds into the 2 clusters in the K-Means clustering 620.

To execute 620 K Means with seed K value of 2 until stopping criteria (experiments show that a stopping criteria of Cluster Size⇐10 yields good results) is met. FIG. 6B illustrates, in a flowchart, an example of a method of K Means clustering 620, in accordance with some embodiments. The method 620 comprises:

```
k = 2 (622)
While hasReachedStoppingCriteria(ClusterList) == false { (624)
    ClusterList = runKMeansClustering(k) (626)
    k++ (628)
}
// Sort all clusters in ClusterList descending from their content size (i.e., c[0] contains
// TextBlocks > c[1] >...>c[k])
    Let c = c[0] (630)
    For each Cluster c in ClusterList { (632)
        For each TextBlock t in Cluster c { (634)
            remove special characters in t (636)
            For each Line l in TextBlock t { (638)
                if (l.length( ) >= 35 || l.length( ) <= 2 || l.wordCount( ) > 5) { (640)
                    l is disqualified as a potential candidate that contains the Logo text (642)
                }
                if (l.wordCount( ) == 1 && l.length( ) > 3 && l.isNumber( )) { (644)
                // This last condition catches serial/acc #'s
                    l is disqualified as a potential candidate that contains the Logo text (646)
                }
                CandidateList.add(l) (648)
                if (l.wordCount == 1 && l.lenght( ) > 3) { (650)
                // (e.x. ML Kit will often detect Enbridge logo as eEnbridge; this step adds "Enbridge"
                // to the list of potential logos if "eEnbridge" is already present)
                    CandidateList.add(l.substring(1)) (652)
                }
            }
        }
    }
```

Logos often have text in them, and could be extracted using OCR. A challenge lies in determining which text string extracted by OCR, out of all the strings, is likely to be associated with a logo. In general, text associated with logos are often large, but not necessarily the largest in the document. Through the use of clustering, groups of text that are "large enough", and thus are likely to be associated with a logo, may be located. Upon finding a cluster of strings that are "large enough", the payee database (i.e., association database) may be searched on all the string in the cluster for a match. In some embodiments, a machine learning classification method may be employed to classify text strings extracted by OCR. In some embodiments, the classification method may comprise a clustering method. In some embodiments, the clustering method may comprise an unsupervised clustering method. In some embodiments, the unsupervised clustering method may comprise at least one of a k-means clustering method, or a head/tails breaks clustering method.

Figure 6A:
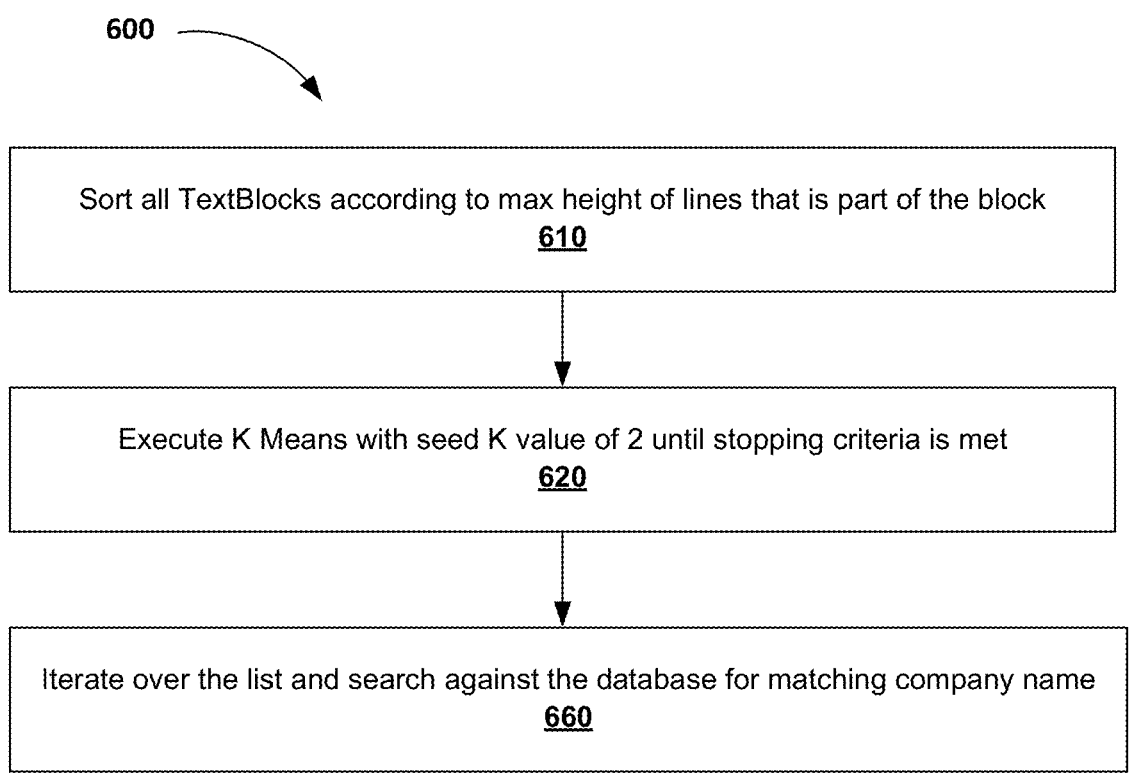
FIG. 6A illustrates, in a flowchart, an example of a method of matching a logo text, in accordance with some embodiments.
Figure 6B:
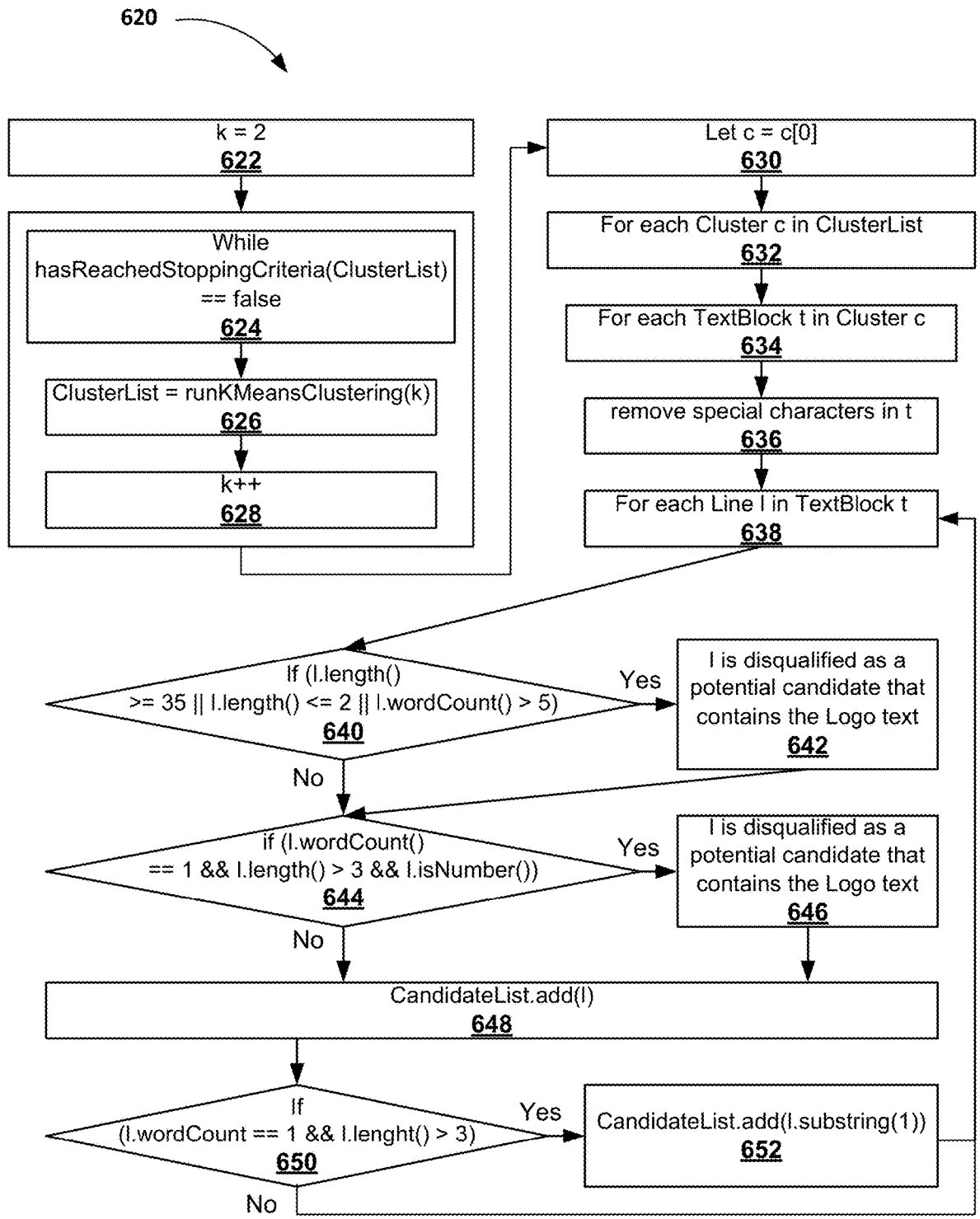
FIG. 6B illustrates, in a flowchart, an example of a method of K Means clustering, in accordance with some embodiments.

FIG. 6A illustrates, in a flowchart, an example of a method 600 of matching a logo text, in accordance with some embodiments. The method 600 comprises sorting 610 all TextBlocks according to max height of lines that is part of the block, executing 620 K Means with seed K value of 2 until stopping criteria [1st cluster⇐10 elements] is met, and iterating 660 over the list and search against the database for matching company name.

Figure 6C:
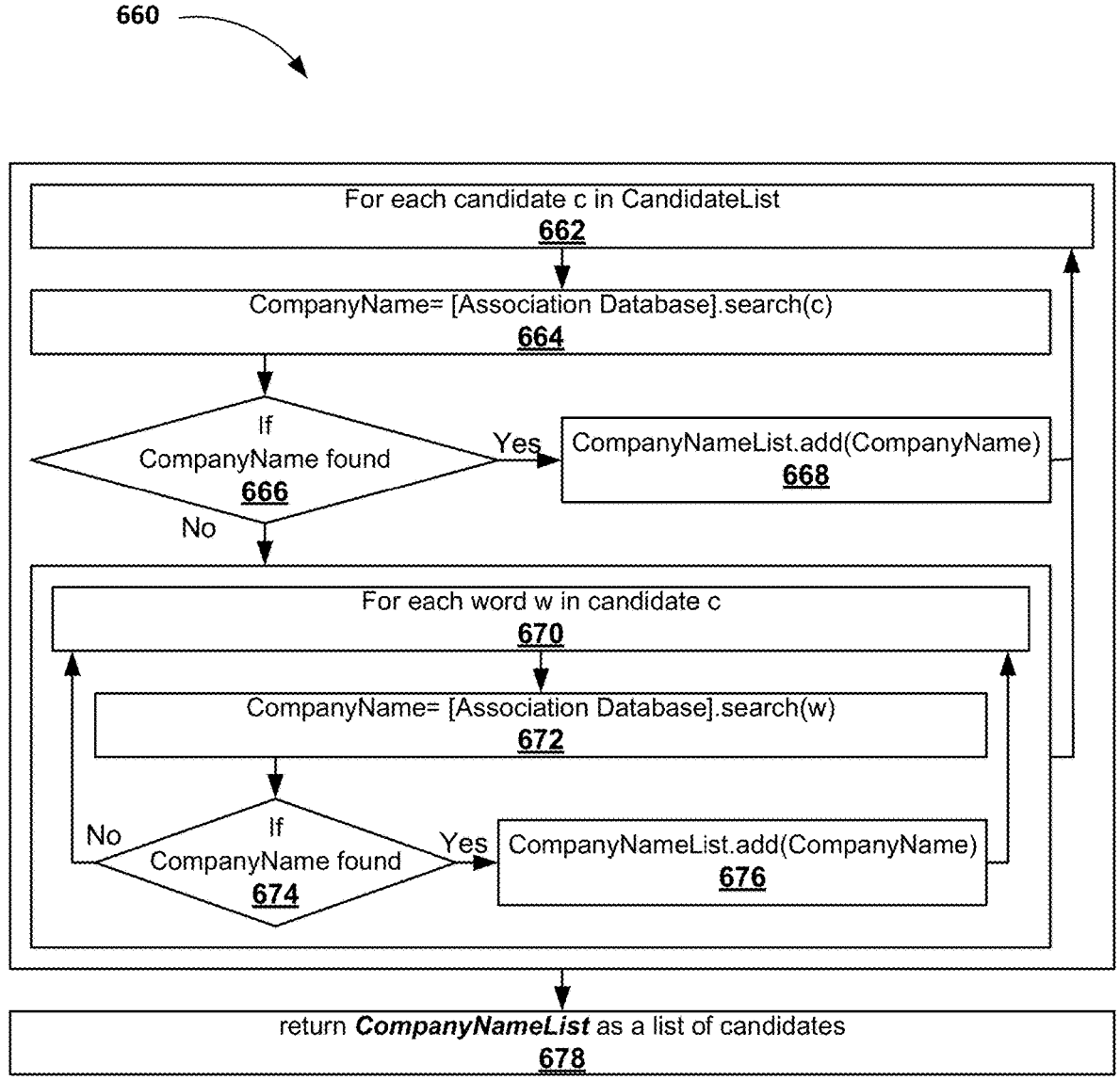
FIG. 6C illustrates, in a flowchart, an example of iterating over the list and search against the database for matching company name, in accordance with some embodiments.

To sort 610 all text blocks according to max height of lines that is part of the block, a sorting algorithm (for example, quick sort) may be applied to the height of the text blocks. After sorting the text blocks, the largest and smallest FIG. 6C illustrates, in a flowchart, an example of iterating 660 over the list and search against the database for matching company name, in accordance with some embodiments. The method 660 comprises:

```
For each candidate c in CandidateList { (662)
    CompanyName= [Association Database].search(c) (664)
    if CompanyName found { (666)
        CompanyNameList.add(CompanyName) (668)
    }
    Else {
        For each word w in candidate c { (670)
            CompanyName= [Association Database].search(w) (672)
            if CompanyName found { (674)
                CompanyNameList.add(CompanyName) (676)
            }
        }
    }
}
Return CompanyNameList as a list of candidates (678)
```

In some embodiments, a database is searched using the company logo name, and the database can have more than one company name matching it. For example, with Rogers, there may be different entries having the same substring "Rogers" such as Rogers (6 digit), Rogers (9 digit), Rogers (12 digit), etc. In such cases, a dialog may be provided to the user to select the company from the multiple possible matches. In some embodiments, the list of the companies are not ranked.

In some embodiments, the logo detection unit 128 may comprise a memory that stores instructions that when executed by a processor cause the processor to perform a method that takes as an input a list of text blocks from the OCR component 112, tokenizes the blocks into lines and clusters them using head/tail breaks. The method outputs a set of company name candidates that are searched against the payee database (i.e., association database) for matches.

Logos often have text in them, and could be extracted using OCR. A challenge lies in figuring out which text string extracted by OCR, out of all the strings, is likely to be associated with a logo. In general, text associated with logos are often large, rare (low frequency of occurrence), but not necessarily the largest in the document. Furthermore, the relationship between text size and number of occurrence may follow the power law. Head/Tails break allows for the location of groups of text that are large and rare, and thus are likely to be associated with a logo. Upon finding a group of strings that are "large and rare" the group of strings may be searched against a payee database (i.e., association database) on all the string in the group for a match.

Figure 7:
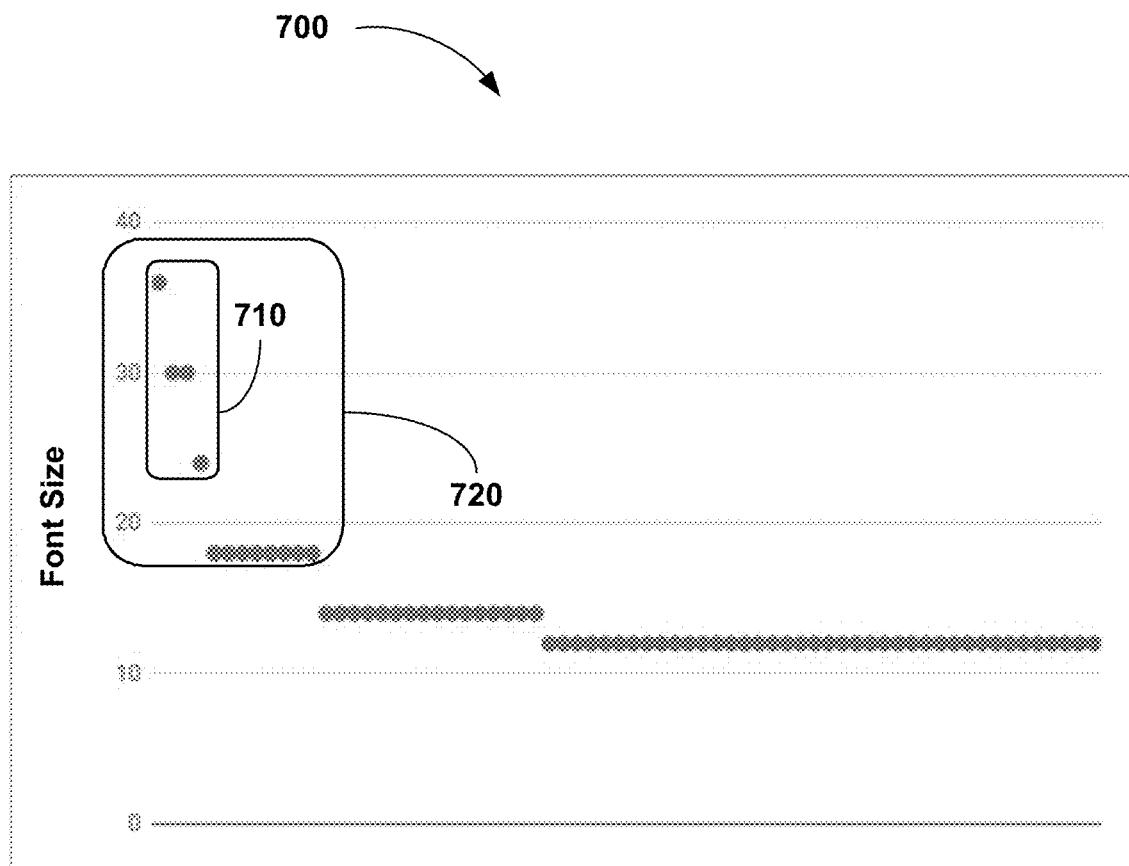
FIG. 7 illustrates, in a graph, an example of a distribution of font sizes on a typical bill, in accordance with some embodiments.

FIG. 7 illustrates, in a graph, an example of a distribution 700 of font sizes on a typical bill, in accordance with some embodiments. The circle 710 denotes text that is likely associated with a logo. Head-Tail breaks works well in identifying low frequency events, and will group text with big fonts that are rare in their own cluster (e.g., font sizes 36, 32, 32, 23). Conversely, the cluster produced by K-Means (denoted by circle 720) will group rare and non-rare elements into the same cluster.

As noted that the head/tails break algorithm produces better clusters over algorithms such as k-means, and Jenks natural break. There are several reasons for this. First, the head/tails break algorithm naturally determines the number of clusters (i.e., classes) based on human binary thinking and applies to data that follows a heavy-tailed distribution. Other clustering algorithms, such as k-means and Jenks, do not determine the number of clusters automatically. In those clustering algorithms, the optimal number of clusters are guessed based on a threshold. Second, k-means and Jenks might get stuck on a local minimum during iterations, thereby failing to find the global maximum. Head/Tails break does not have this issue. Third, head/tails break is good at identifying low-frequency events, and grouping them in their own cluster/group. For example, in FIG. 7, head/tails break will place font sizes 36, 30, 30 and 24 in its own cluster. K-Means on the other hand might place font sizes 36, 30, 30, 24 the group of 18s in the same cluster (failing to recognize the rarity of occurrence).

Figure 8A:
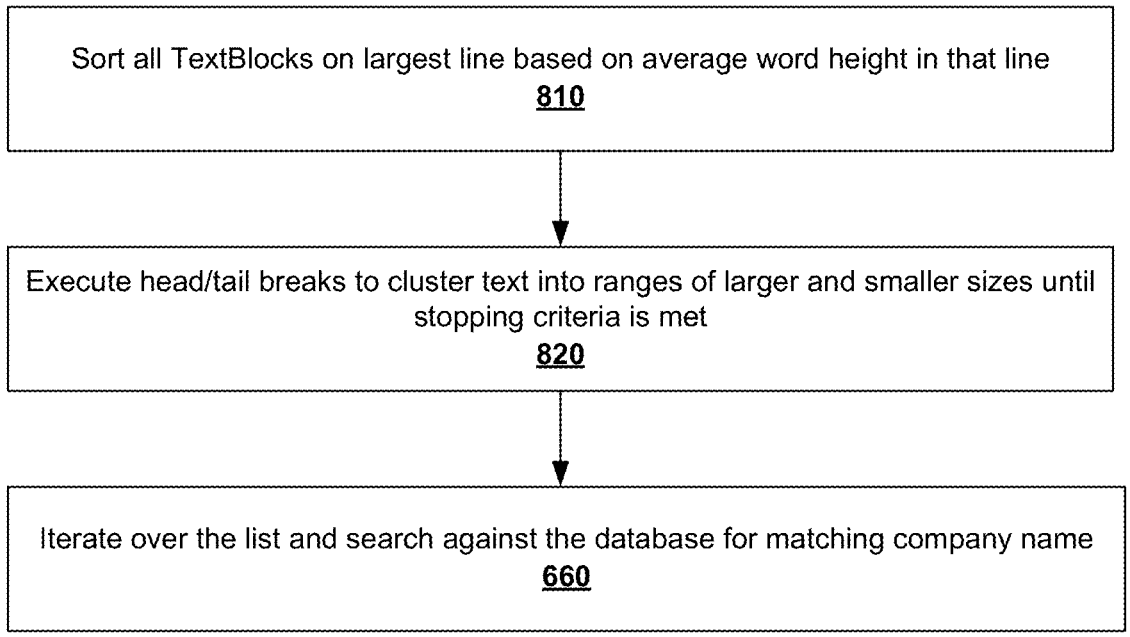
FIG. 8A illustrates, in a flowchart, an example of a method of logo detection using head/tails breaks clustering of the font of OCRed text, in accordance with some embodiments.

FIG. 8A illustrates, in a flowchart, an example of a method 800 of logo detection using head/tails breaks clustering of the font of OCRed text, in accordance with some embodiments. The method 800 comprises sorting 810 all text blocks on the largest line based on average word height in that line, executing 820 a head/tail breaks to cluster text into ranges of larger and smaller sizes until a stopping criteria (e.g., the proportion of head is not less than 51%) is met, and iterating 660 over the list and search against the database for matching company name.

To sort 810 all text blocks on the largest line based on average word height in that line, a sorting algorithm (for example, quick sort) may be applied to the length of the text blocks. The sorted blocks are used as inputs into the head/tail break clustering 820.

Figure 8B:
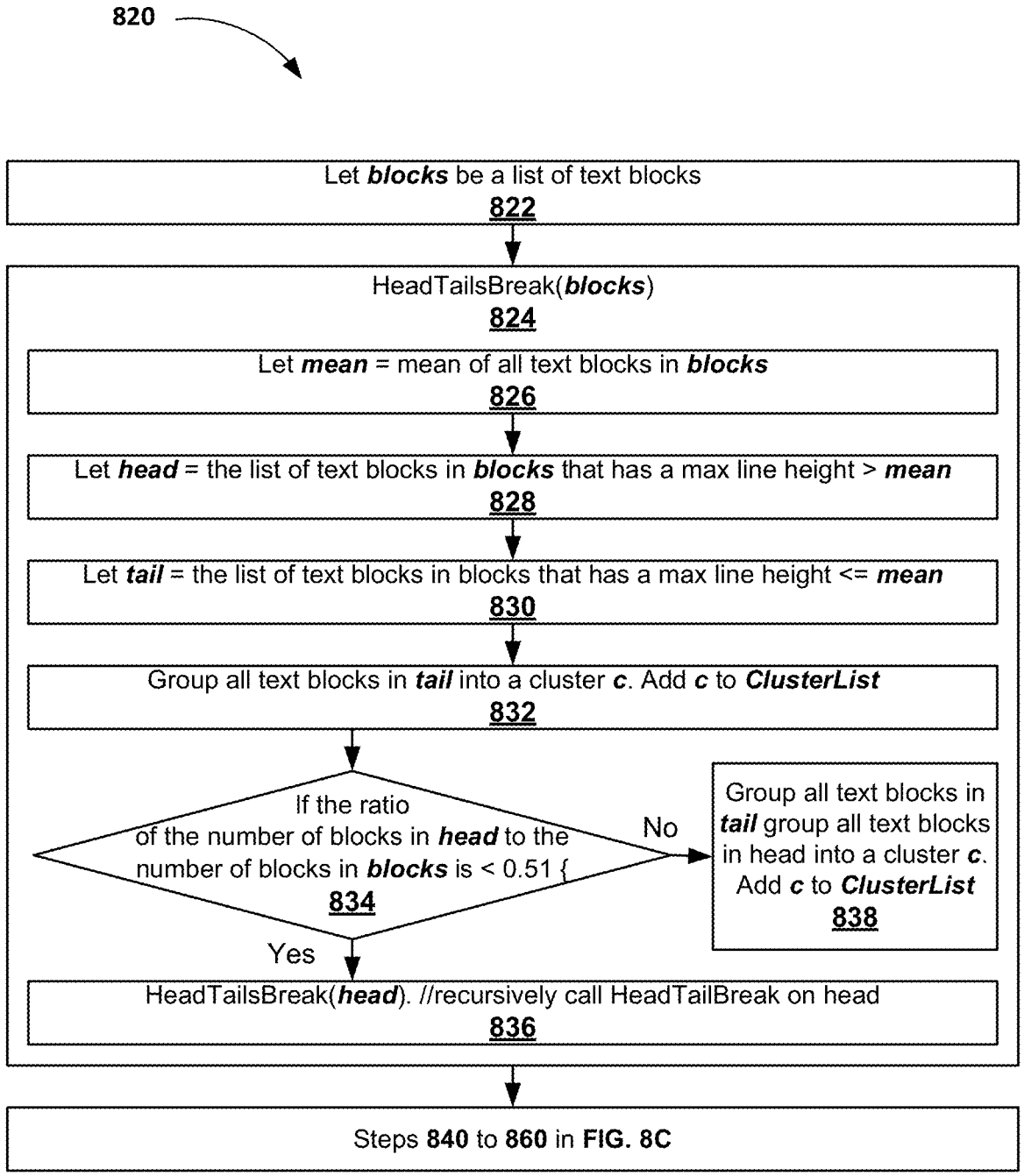
FIGS. 8B and 8C illustrate, in flowcharts, an example of a method of head/tails breaks clustering, in accordance with some embodiments.
Figure 8C:
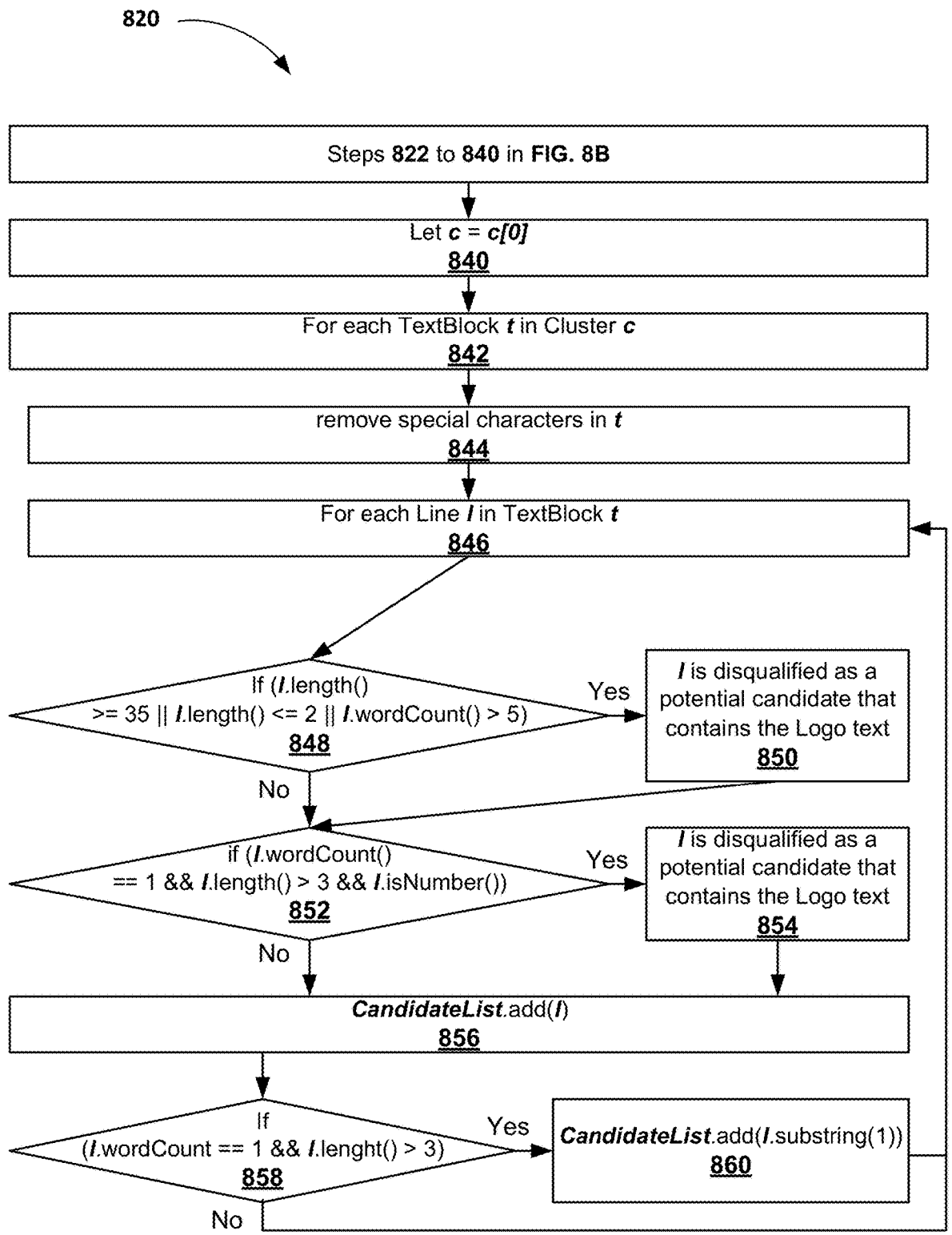

To execute 820 head/tail breaks on the sorted text blocks until a stopping criteria (experiments shows that a stopping criteria of head.size( )/blocks.size( )<0.51 yields good results) is met. FIGS. 8B and 8C illustrate, in flowcharts, an example of a method of head/tails breaks clustering 820, in accordance with some embodiments. Resultant clusters of head/tails break in are stored in a list (e.g., ClusterList). The method 820 comprises:

```
Let blocks be a list of text blocks (822)
HeadTailsBreak(blocks) { (824)
    let mean = mean of all text blocks in blocks (826)
    let head = the list of text blocks in blocks that has a max line height > mean (828)
    let tail = the list of text blocks in blocks that has a max line height <= mean (830)
    group all text blocks in tail into a cluster c. Add c to ClusterList (832)
    if the ratio of the number of blocks in head to the number of blocks in blocks is < 0.51 {
    (834)
        HeadTailsBreak(head). //recursively call HeadTailBreak on head (836)
    }
    else {
        group all text blocks in head into a cluster c. Add c to ClusterList (838)
    }
}
// Sort all clusters in ClusterList descending from their content size (ie c[0] contains
// TextBlocks > c[1]>...>c[k])
    Let c = c[0] (840)
    For each TextBlock t in Cluster c { (842)
        remove special characters in t (844)
        For each Line l in TextBlock t { (846)
            if (l.length( ) >= 35 || l.length( ) <= 2 || l.wordCount( ) > 5) { (848)
                / is disqualified as a potential candidate that contains the Logo text (850)
            }
            if (l.wordCount( ) == 1 && l.length( ) > 3 && l.isNumber( )) { (852)
            // This last condition catches serial/acc #'s
                l is disqualified as a potential candidate that contains the Logo text (854)
            }
            CandidateList.add(l) (856)
            if (l.wordCount == 1 && l.lenght( ) > 3) { (858)
            // (e.x. ML Kit will often detect Enbridge logo as eEnbridge; this step adds "Enbridge"
            // to the list of potential logos if "eEnbridge" is already present)
                CandidateList.add(l.substring(1)) (860)
            }
        }
    }
}
```

The method 660 of FIG. 6C may then be used to iterate over the list (e.g., ClusterList) and search against the database for matching company name.

When finding Companies from a bill through OCR, sometimes the methods described herein that are performed (e.g., Postal Code, PO Box, URL, Logo) may not be sufficient. For example, for a Rogers (12-Digit Account Number) bill, the four methods described herein may be certain the bill in question belongs to Rogers, but may not be able to determine if the bill is a 'Rogers (12-Digit Account Number)' or a 'Rogers (9-Digit Account Number)'. In such situations, a reverse account number mapping may be useful.

Reverse account number mapping searches for relevant account numbers from the text blocks. Using these account numbers, it tries to match the account number format in the payee database (e.g., association database) to companies found via the other four methods described above, boosting their confidence if they generate a match(es).

In some embodiments, there are two types of matchers in the account number mapping: i) length matcher; and ii) format matcher (regrex). A partial match may occur when a potential account number agrees with the format matcher's length, but not its regexes. A full match may occur when a potential account number agrees with both a format matcher's length and its regexes. For any given Company, if there are any full matches found, partial matches may be discarded.

After the reverse account number mapping takes place, the confidences of all the Companies found may be calculated, as described herein. However, there are now additional parameters and weightings involving the matches (or lack thereof) of Account Numbers. Weights may include Full Account Number Match (e.g., 59), Partial Acc Num Match (e.g., 17), No Acc Num Match (e.g., 0). Reinforcement Multipliers may be updated to, for example, {1, 0.3, 0.1, 0.05, 0.03}. Based on these new confidences, confidence filtering may be run with the remaining companies returned.

The scoring engine 140 may comprise a memory that stores instructions that when executed by a processor cause the processor to perform a method that takes as an input a set of payee names from the payee database (i.e., association database) and the associated matcher (i.e., postal code matcher unit 122, PO box matcher unit 124, URL matcher unit 126 or logo detection unit 128) and decides which payee name to present to the user for form filling based on a predefined set of scoring criteria.

A priority value may be assigned to a matching unit. This is the order in which the matching units methods would be run.

A weight (W) value may be assigned to a payee matching method. This is the confidence rating of a company found through the corresponding method.

Table 1 shows an example of priority and weight values for matching detection methods.

TABLE 1

| Detection Method, Priority and Weight | | |
|---|---|---|
| Detection Method | Priority | Weight |
| Postal Code | 1 | 68% |
| PO Box | 2 | 65% |
| URL | 3 | 60% |

TABLE 1-continued

| Detection Method, Priority and Weight | | |
|---|---|---|
| Detection Method | Priority | Weight |
| Logo Detection (K-Means) | 4 | 50% |

Table 1 shows the postal code matching method 200, 400 with a priority value of 1 and a weight of 68%, the PO box matching method 300, 400 with a priority value of 2 and a weight of 65%, the URL matching method 500 with a priority value of 3 and a weight of 60%, and the logo detection method 600 with a priority value of 4 and a weight of 50%.

Table 2 shows another example of priority and weight values for matching detection methods.

TABLE 2

| Detection Method, Priority and Weight | | |
|---|---|---|
| Detection Method | Priority | Weight |
| Postal Code | 1 | 69% |
| PO Box | 2 | 67% |
| URL | 3 | 61% |
| Logo Detection (Head/Tails Breaks) | 4 | 51% |
| Reverse Account Number Matcher | 5 | |
| Full | | 59% |
| Partial | | 17% |
| No | | 0% |

Table 2 shows the postal code matching method 200, 400 with a priority value of 1 and a weight of 69%, the PO box matching method 300, 400 with a priority value of 2 and a weight of 67%, the URL matching method 500 with a priority value of 3 and a weight of 61%, the logo detection method 800 with a priority value of 4 and a weight of 51%, and the reverse account number mapping with a priority value of 5 and weights of 59% for a full match, 17% for a partial match and 0% for no match.

A repeated occurrence number is the number of times this result has appeared in a separate matching method. For example, if ROGERS was found with the postal code matching method, and the confidence rating of ROGERS found through the PO box method is being evaluated, the result number would be 2.

A reinforcement multiplier ($M_{re}$) is the multiplier given to repeated results in more than one matching method for the same company (since each time the same company is found, the confidence delta decreases.

Table 3 shows an example of repeated occurrence number and corresponding reinforcement multiplier.

TABLE 3

| Repeated Occurrence Number and corresponding Reinforcement Multiplier | |
|---|---|
| Repeated Occurrence Number | Reinforcement Multiplier |
| 1 | 1 |
| 2 | 0.3 |
| 3 | 0.1 |
| 4 | 0.05 |

In some embodiments, the weight (W) of the matching methods for postal code 200, 400, PO box 300, 400, URL 500 and logo detection 600 may be expressed in the following array:

$W_{method}=[0.68, 0.65, 0.60, 0.50]$

In some embodiments, the reinforcement multiplier ($M_{re}$) for repeated occurrence values of 1, 2, 3 and 4 may be expressed in the following array:

$M_{re}=[1, 0.3, 0.1, 0.05]$

The following steps may be used to determine a score:

For i=0 in all matches
    $P_{method}$=(Priority of the matching method)−1
    $TW_{method}$+=$W_{method}[P_{method}]*M_{re}$ [i]
return (companyname, $TW_{method}$)

Expressed another way, the matching methods (Postal Code 200, 400, PO Box 300, 400, URL 500 and Logo Detection 600, 800) are applied to a document to obtain a list of company name candidates. Let $P_{method}$ be a list of matching method ordered by the priority in Table 1. For example, according to Table 1, $P_{method}$ is an ordered list of matching methods [Postal Code, PO Box, URL, Logo Detection]. Then the following steps may determine the score:

For each candidate company name C
    For i=0 . . . 3
        If $P_{method[i]}$ yielded C as a candidate
            $C_{confidence}$+=$W_{method[i]}*M_{re[i]}$
return (C, $C_{confidence}$)

where $C_{confidence}$ is the final confidence rating for company name candidate C.

Table 4 shows another example of repeated occurrence number and corresponding reinforcement multiplier.

TABLE 4

Repeated Occurrence Number and corresponding Reinforcement Multiplier

| Repeated Occurrence Number | Reinforcement Multiplier |
| --- | --- |
| 1 | 1 |
| 2 | 0.3 |
| 3 | 0.1 |
| 4 | 0.05 |
| 5 | 0.03 |

In some embodiments, the weight (W) of the matching methods for postal code 200, 400, PO box 300, 400, URL 500 and logo detection 800 may be expressed in the following array:

$W_{method}=[0.69, 0.67, 0.61, 0.51, [W_{acct}]]$

In some embodiments, the weight (W) of the reverse account number matcher values for full, partial and no match may be expressed in the following array:

$W_{acct}=[0.59, 0.17, 0]$

In some embodiments, the reinforcement multiplier ($M_{re}$) for repeated occurrence values of 1, 2, 3, 4 and 5 may be expressed in the following array:

$M_{re}=[1, 0.3, 0.1, 0.05, 0.03]$

The following steps may be used to determine a score:

For i=0 in all matches
    $P_{method}$=(Priority of the matching method)−1
    $TW_{method}$+=$W_{method}[P_{method}]*M_{re}$ [i]
return (companyname, $TW_{method}$)

Expressed another way, the matching methods (Postal Code 200, 400, PO Box 300, 400, URL 500 and Logo Detection 800) are applied to a document to obtain a list of company name candidates. Let $P_{method}$ be a list of matching method ordered by the priority in Table 2. For example, according to Table 2, $P_{method}$ is an ordered list of matching methods [Postal Code, PO Box, URL, Logo Detection]. Then the following steps may determine the score:

For each candidate company name C
    For i=0 . . . 4
        If $P_{method[i]}$ yielded C as a candidate
            $C_{confidence}$+=$W_{method[i]}*M_{re[i]}$
return (C, $C_{confidence}$)

where $C_{confidence}$ is the final confidence rating for company name candidate C.

Table 5 illustrates examples of a confidence rating score for combinations of the matching methods. A check indicates that a payee was located using the method, an x indicates that a payee was not located.

TABLE 5

Confidence Scores for combinations of Matching Detection Methods

| Postal Code | PO Box | URL | Logo Detection | Confidence Rating |
| --- | --- | --- | --- | --- |
| ✓ | ✓ | ✓ | ✓ | 96 |
| ✓ | ✓ | ✓ | X | 93.5 |
| ✓ | ✓ | X | ✓ | 92.5 |
| ✓ | ✓ | X | X | 87.5 |
| ✓ | X | ✓ | ✓ | 91 |
| ✓ | X | ✓ | X | 86 |
| ✓ | X | X | ✓ | 83 |
| ✓ | X | X | X | 68 |
| X | ✓ | ✓ | ✓ | 88 |
| X | ✓ | ✓ | X | 83 |
| X | ✓ | X | ✓ | 80 |
| X | ✓ | X | X | 65 |
| X | X | ✓ | ✓ | 75 |
| X | X | ✓ | X | 60 |
| X | X | X | ✓ | 50 |
| X | X | X | X | 0 |

Table 6 illustrates an example scenario of the application of steps of determining a (confidence) score on company names {A, B, C and D}. Note the change in confidence rating as the matching units are executed in the order prescribed in Table 1.

TABLE 6

Example Confidence Ratings Scenario

| Detection Method | Companies Found | Confidence Ratings | | | |
| --- | --- | --- | --- | --- | --- |
| | | A | B | C | D |
| Postal Code | A | 68 (68 * 1, where 1 = reinforcement multiplier) | 0 | 0 | 0 |
| PO Box | A, B | 87.5 (68 * 1 + 65 * 0.3, where 1 and 0.3 = respective reinforcement multipliers) | 65 (65* 1, where 1 = reinforcement multiplier) | 0 | 0 |
| URL | A | 93.5 (68 * 1 + 65 * 0.3 + 60 * 0.1, where 1, | 65 (No change in confidence for B) | 0 | 0 |

TABLE 6-continued

Example Confidence Ratings Scenario

| Detection Method | Companies Found | Confidence Ratings A | B | C | D |
|---|---|---|---|---|---|
| | | 0.3 and 0.1 = respective reinforcement multipliers) | | | |
| Logo Detection | B, C, D | 93.5 (No change in confidence for A) | 80 (65 * 1 + 50 * 0.3, where 1 and 0.3 = respective reinforcement multipliers) | 50 (50 * 1, where 1 reinforcement multiplier) | 50 (50 * 1, where 1 = reinforcement multiplier) |
| Final Confidence Ratings | | 93.5 | 80 | 50 | 50 |

After the execution of the method of determining the (confidence score) on the above sample data, there is a final confidence rating for each of the company names {A, B, C and D}. In some embodiments, a ranked list of company names may be presented to the user for selection. Alternatively, only the company name with the highest final confidence rating may be presented to the user.

Table 7 illustrates examples of a confidence rating score for combinations of the matching methods. A check indicates that a payee was located using the method, an x indicates that a payee was not located.

TABLE 7

Confidence Scores for combinations of Matching Detection Methods

| PO Box | Postal Code | URL | Logo | Account Number Match | Value |
|---|---|---|---|---|---|
| ✓ | ✓ | ✓ | ✓ | Full | 99.52 |
| ✓ | ✓ | ✓ | ✓ | Partial | 98.26 |
| ✓ | ✓ | ✓ | X | Full | 98.15 |
| ✓ | ✓ | ✓ | ✓ | None | 97.75 |
| ✓ | ✓ | X | ✓ | Full | 97.15 |
| ✓ | ✓ | ✓ | X | Partial | 96.05 |
| X | ✓ | ✓ | ✓ | Full | 95.35 |
| ✓ | ✓ | ✓ | X | None | 95.20 |
| ✓ | ✓ | X | ✓ | Partial | 95.05 |
| ✓ | ✓ | X | X | Full | 95.00 |
| ✓ | ✓ | X | ✓ | None | 94.20 |
| ✓ | X | ✓ | ✓ | Full | 93.35 |
| X | ✓ | ✓ | ✓ | Partial | 93.25 |
| X | ✓ | ✓ | X | Full | 93.20 |
| X | ✓ | ✓ | ✓ | None | 92.40 |
| ✓ | X | ✓ | ✓ | Partial | 91.25 |
| ✓ | X | ✓ | X | Full | 91.20 |
| ✓ | X | ✓ | X | Partial | 90.80 |
| ✓ | X | ✓ | ✓ | None | 90.40 |
| X | ✓ | X | ✓ | Full | 90.20 |
| ✓ | X | X | X | None | 89.10 |
| X | ✓ | ✓ | X | Partial | 89.00 |
| ✓ | X | X | ✓ | Full | 88.20 |
| X | ✓ | ✓ | X | None | 87.30 |
| ✓ | X | X | X | Partial | 87.00 |
| X | ✓ | X | X | Full | 86.70 |
| ✓ | X | X | ✓ | Partial | 86.00 |
| ✓ | X | X | X | None | 85.30 |
| ✓ | X | X | X | Full | 84.70 |
| X | ✓ | X | ✓ | None | 84.30 |
| ✓ | X | X | ✓ | Partial | 84.00 |
| ✓ | X | X | ✓ | None | 82.30 |

TABLE 7-continued

Confidence Scores for combinations of Matching Detection Methods

| PO Box | Postal Code | URL | Logo | Account Number Match | Value |
|---|---|---|---|---|---|
| X | X | ✓ | ✓ | Full | 82.20 |
| X | X | ✓ | X | Full | 78.70 |
| X | X | ✓ | ✓ | Partial | 78.00 |
| X | X | ✓ | ✓ | None | 76.30 |
| X | ✓ | X | X | Partial | 74.10 |
| ✓ | X | X | X | Partial | 72.10 |
| X | ✓ | X | X | None | 69.00 |
| X | X | X | ✓ | Full | 68.70 |
| ✓ | X | X | X | None | 67.00 |
| X | X | ✓ | X | Partial | 66.10 |
| X | X | ✓ | X | None | 61.00 |
| X | X | X | ✓ | Partial | 56.10 |
| X | X | X | ✓ | None | 51.00 |

Table 8 illustrates an example scenario of the application of steps of determining a (confidence) score on company names {A, B, C and D}. Note the change in confidence rating as the matching units are executed in the order prescribed in Table 2.

TABLE 8

Example Confidence Ratings Scenario

| Detection Method | Companies Found | Confidence Ratings A | B | C | D |
|---|---|---|---|---|---|
| Postal Code | A | 69 (69 * 1, where 1 = reinforcement multiplier) | 0 | 0 | 0 |
| PO Box | A, B | 89.1 (69 * 1 + 67 * 0.3, where 1 and 0.3 = respective reinforcement multipliers) | 67 (67 * 1, where 1 = reinforcement multiplier) | 0 | 0 |
| URL | A | 95.2 (69 * 1 + 67 * 0.3 + 61 * 0.1, where 1, 0.3 and 0.1 = respective reinforcement multipliers) | 67 (No change in confidence for B) | 0 | 0 |
| Logo Detection | B, C, D | 95.2 (No change in confidence for A) | 82.3 (67 * 1 + 51 * 0.3, where 1 and 0.3 = respective reinforcement multipliers) | 51 (51 * 1, where 1 = reinforcement multiplier) | 51 (51 * 1, where 1 = reinforcement multiplier) |
| Reverse Account Number Match Full | A | 98.15 | 82.3 | 51 | 51 |
| Final Confidence Ratings | | 98.15 | 82.3 | 51 | 51 |

After the execution of the method of determining the (confidence score) on the above sample data, there is a final confidence rating for each of the company names {A, B, C and D}. In some embodiments, a ranked list of company names may be presented to the user for selection. Alternatively, only the company name with the highest final confidence rating may be presented to the user.

Ranking of companies name matches may be based on two criteria: i) the confidence rating; and ii) an account number score. Each company is compared to each other on the first criteria and ordered from highest confidence to lowest. If there is a tie, the account number score is used to break the tie. Account number scores are based on the distance from the Account keywords to the account number on the bill. The lower the distance the better, with the ideal score of 0.0 going to account numbers which are in the same block as the account keyword.

some embodiments. The account number detection system 900 comprises the OCR component 110, an account number matching unit 920, and an account number candidate determination unit 950. Other components may be added to the payee name detection system 100.

The account number matcher unit 920 may comprise a memory that stores instructions that when executed by a processor cause the processor to perform a method that takes as an input a list of Text Blocks from the OCR component 110, applies a set of logic to the blocks and outputs a set of candidate text that are likely to be the customer's account number.

Figure 10A:
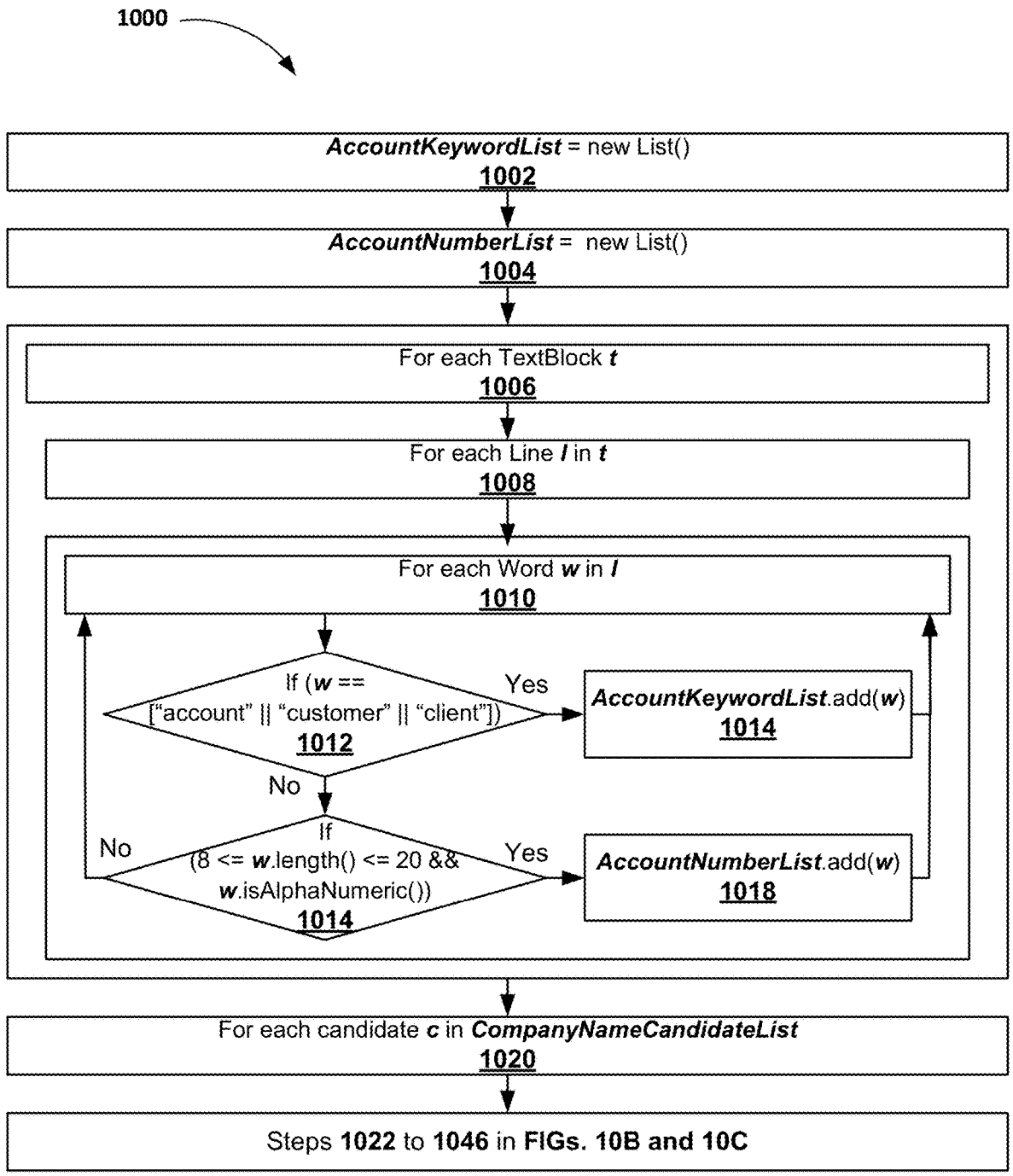
FIGS. 10A to 10C illustrate, in a flowchart, an example of a method of matching an account number, in accordance with some embodiments.
Figure 10B:
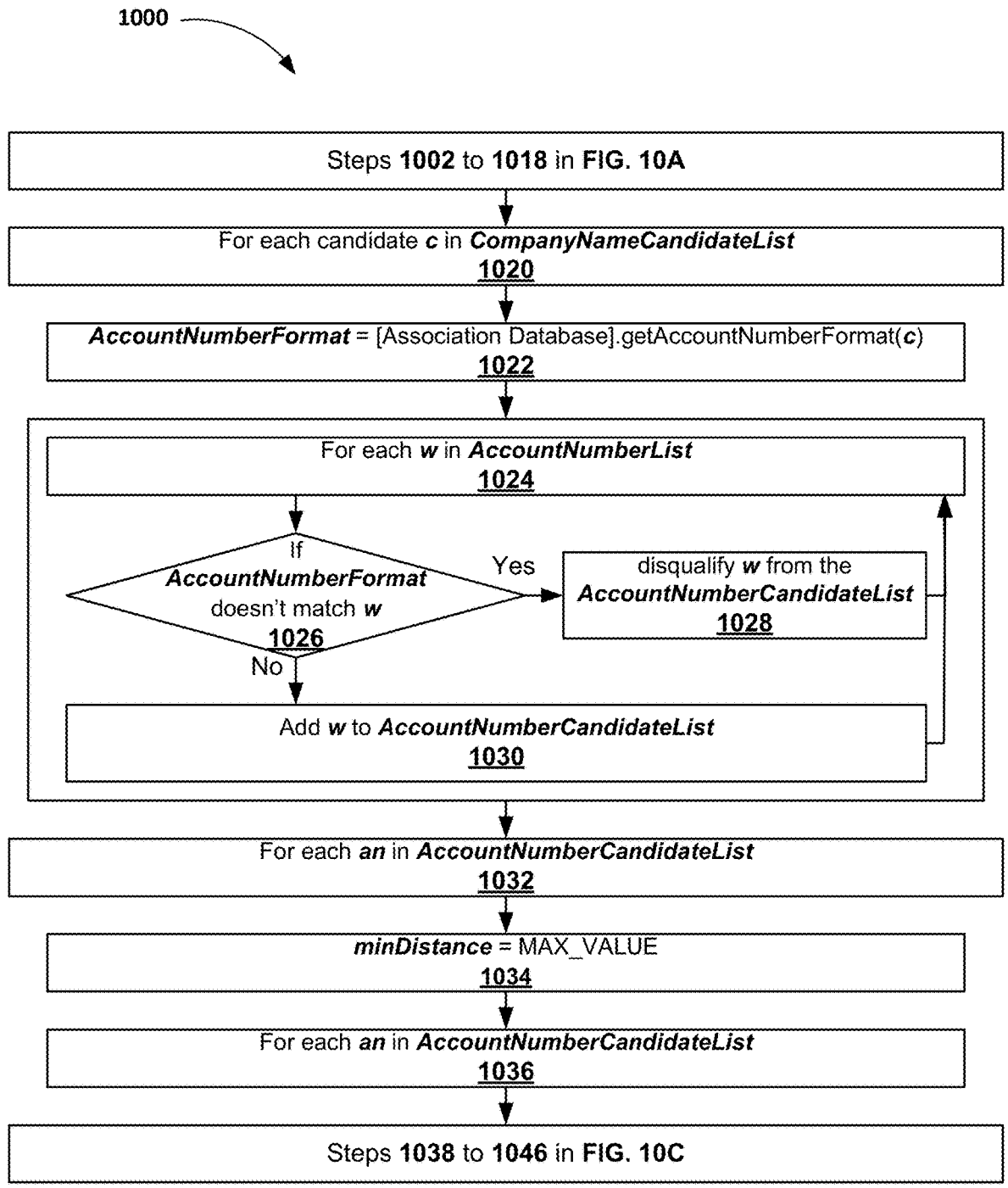
Figure 10C:
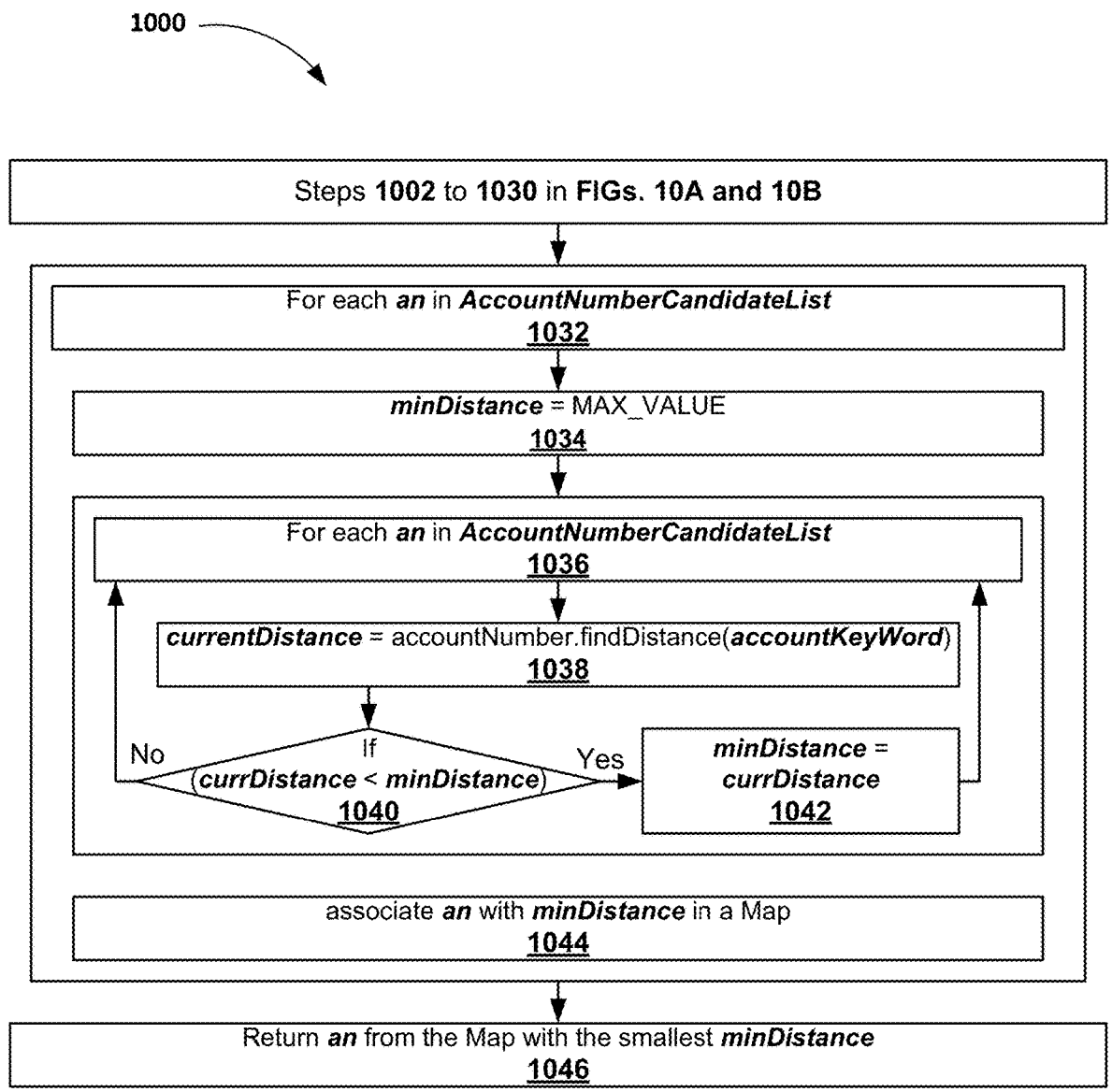

FIGS. 10A to 10C illustrate, in a flowchart, an example of a method 1000 of matching an account number, in accordance with some embodiments. The method 1000 comprises:

```
AccountKeywordList = new List( ) (1002)
AccountNumberList = new List( ) (1004)
For each TextBlock t { (1006)
    For each Line l in t { (1008)
        For each Word w in l { (1010)
            if (w == ["account" || "customer" || "client"]) { (1012)
                AccountKeywordListadd(w) (1014)
            }
            else if (8 <= w.length( ) <= 20 && w.isAlphaNumeric( )) { (1016)
                AccountNumberList.add(w) (1018)
            }
        }
    }
}
For each candidate c in CompanyNameCandidateList { (1020)
    //Retrieve account number pattern matcher (e.g., RegEx) for candidate c
    AccountNumberFormat = [Association Database].getAccountNumberFormat(c) (1022)
    For each w in AccountNumberList { (1024)
        if AccountNumberFormat doesn't match w { (1026)
            disqualify w from the AccountNumberCandidateList (1028)
        }
        else {
            Add w to AccountNumberCandidateList (1030)
        }
    }
    For each an in AccountNumberCandidateList { (1032)
        minDistance = MAX_VALUE (1034)
        For each ak in AccountKeywordList { (1036)
            //Calculate the physical distance between an and ak
            currentDistance = accountNumber.findDistance(accountKeyWord) (1038)
            If (currDistance < minDistance) { (1040)
                minDistance = currDistance (1042)
            }
        }
        associate an with minDistance in a Map (1044)
    }
}
return an from the Map with the smallest minDistance (1046)
```

For example, if the results of the algorithms produced these results:
Bell—95% Confidence. Account Numbers (ABCD1234ZZZ1234—Score 800)
Rogers 9 Digit—65% Confidence. Account Numbers (123456789—Score 133)
Rogers 12 Digit—65% Confidence. Account Numbers (123456789012—Score 40, 112233445566—Score 956)
then the expected ordering would be: 1: Bell; 2: Rogers 12 Digit; 3: Rogers 9 Digit. This is because "Rogers 12 Digit" had a better Account Number score for 123456789012. But "Bell" had the highest confidence so it was first.

Figure 9:
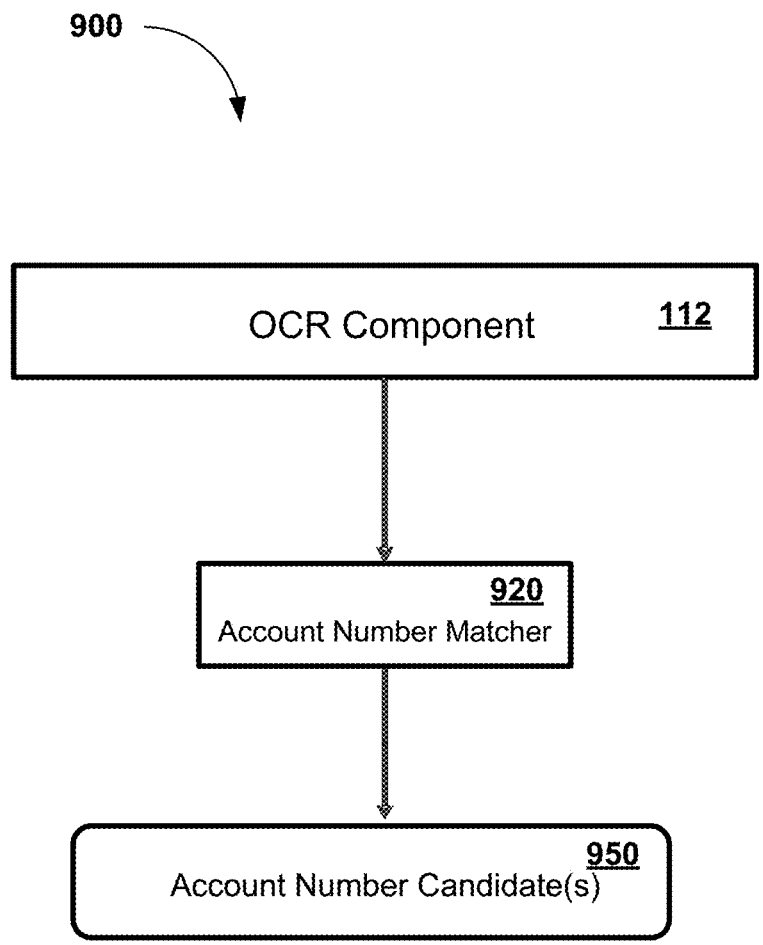
FIG. 9 illustrates, in a component diagram, an example of an account number detection system, in accordance with some embodiments.

FIG. 9 illustrates, in a component diagram, an example of an account number detection system 900, in accordance with In some embodiments, a multi-class classification model (e.g., an artificial neural network) may optionally be trained. In such embodiments, the classes refer to the payee names. The model classifies, with a numerical confidence level, how likely the bill scanned is to be associated with each class. The trained model is deployed as a matcher that provides input into the scoring engine. This allows yet another point of input for the scoring engine to make optimal choices when suggesting payee name candidates to the user.

Labelled training data are obtained by inspecting "user actions" during the usage of the automated bill pay system. One such embodiment of this method involves the presentation of payee candidates on a mobile device to the user, and having the user select the correct payee as part of a bill payment flow. By the virtue of a user explicitly adding a payee that is suggested as a payee name candidate by the system, it can be inferred with a high level of certainty that the data collected can be labelled with the selected payee name.

Figure 11:
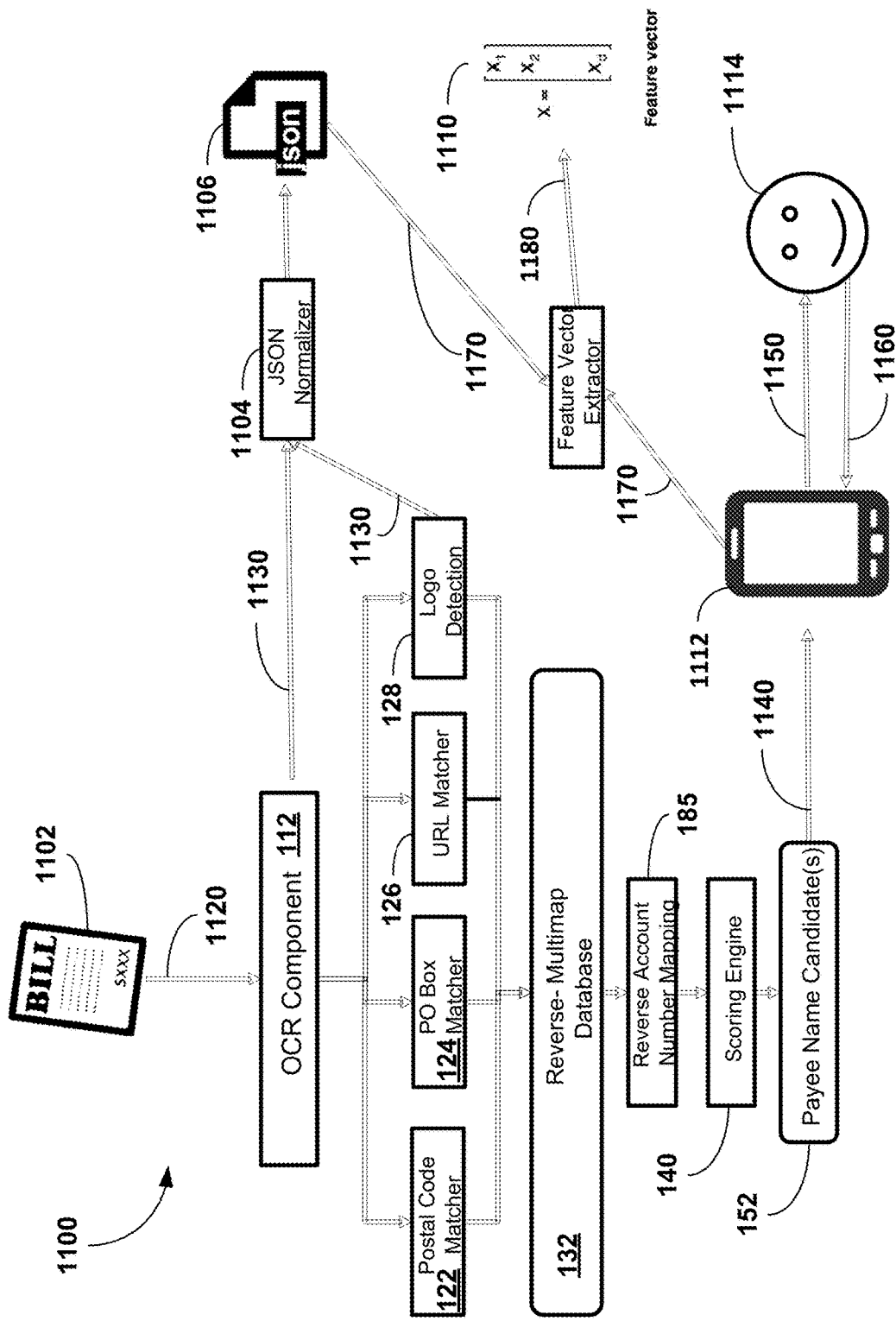
FIG. 11 illustrates, in a component diagram, an example of a process flow for a method of collecting labelled training data, in accordance with some embodiments.

FIG. 11 illustrates, in a component diagram, an example of a process flow for a method of collecting labelled training data 1100, in accordance with some embodiments. The method 1100 comprises an OCR component 112 receiving 1120 a bill 1102. Next, a list of strings that might be associated with a logo (provided by the logo matcher 128, 129) and their spatial information (for example, their {x,y} coordinates, provided by the OCR component 112) are passed 1130 to a JSON normalization component or normalizer 1104. The component 1104 outputs a normalized representation 1106 of this data in JSON format. For example, the JSON normalization component might 1104 output the following JSON for a Financial Institution Credit Card bill. Notice the "text" attribute refers to the strings output by the logo. It should be understood that on a bill or invoice, an actual name for the Financial Institution and/or Credit Card would appear. However, for the purposes of this description, generic terms will be used, such as "FinInstName" and others.

```
{
    "logolines":[
        {
            "boundingBox":{
                "bottom":287,
                "left":299,
                "right":1039,
                "top":148
            },
            "text":"FinInstName"
        }
    ],
    "statistics":{
        "bounding
            "bottom":2805,
            "left":290,
            "right":2587,
            "top":148
        },
        "maxHeight":139,
        "maxWidth":1416,
        "minHeight":22,
        "minWidth":52,
        "numLines":92
    }
}
```

Next, the system 180 processes the bill as described above, outputting 1140 a list of payee name candidates. The candidates may be presented 1150 back to the user, in this case a mobile device 1112 for confirmation/selection. The user sees the list of candidates via their mobile device. This may be presented as a list for example in a mobile application 1112. It should be understood that any other type of structure or component other than a list may be used. The user may select one of the candidates via their mobile device 1112 (i.e., a selection is received 1160) that they deem to accurately represent the scanned bill. The received user selection 1160, along with the normalized JSON 1106 may be sent 1170 to a feature vector extraction component (or feature vector extractor) 1108. The feature vector extraction component 1108 outputs a feature vector 1110 along with a label, and may be used as a labelled training sample to train a multi-class classification model.

Given the normalized JSON 1106 as input, the feature vector extractor 1110 may iterate through the logoLines array in the normalized JSON 1106, extracting and vectorizing the following features of the logoLines object:
1. "text": The "text" string refers to the string identified to be associated with the logo detection matcher (e.g., logo detection unit 128). In the above example, "FinInstName" was identified as the logo string
2. "bounding box": This gives the 4 corners (in x,y coordinates) of the minimum bounding box of the "text" string with respect to the bill Vectorization Method for Logo Text As previously mentioned, the logo text is stored in the "text" field of the logoLines object. Text are typically vectorized using the "Bag of Words" (BOW) technique. The BOW technique involves the creation of a dictionary of size N for the entire corpus, and subsequently assigning each word of the dictionary to an element of a size N vector. The problem with this approach is that N would be large, and that it is very difficult to build a dictionary of words that have not been seen before by the implementation.

For these reasons, a feature hashing (such as described at https://en.wikipedia.org/wiki/Feature_hashing) may be employed on the string field "text". In order to preserve ordering (e.g., The "SERVICE PROVIDER" needs to yield a different vector than "PROVIDER SERVICE"), the string field "text" is converted into a n-gram prior to the application of the hash function. In some embodiments, a bi-gram conversion, with a hashing dimension of 100 was observed to yielded excellent results. The resultant vector is named "logo text feature vector".

Using our the example JSON described above, the string "FinInstName" is vectorized as follows:
1. Convert into a bi-gram:
   ['Fi', 'in', 'nI', 'In', 'ns', 'st', 'tN', 'Na', 'am', 'me']
2. The bi-gram is fed into a hashing function (for example, one provided by Keras's hashing_trick library https://keras.io/preprocessing/text/) and a vector is constructed. The output of the hashing function is the following vector:
   [hash("Fi"), hash("in"), hash("nI"), hash("ns"), hash("st"), hash("tN"), hash("Na"), hash("am"), hash("me")]
   =[5 17 60 17 68 23 78 1 72 56]
3. The vector is then padded (or in some cases truncated) to a fixed number of elements, for example, 50 elements:
   [5 17 60 17 68 23 78 1 72 56 0 0 0 0 0 0 0 0 0 0 0 0 0 0 0 0 0 0 0 0 0 0 0 0 0 0 0 0 0 0 0 0 0 0 0 0 0 0 0 0]

It should be noted that the logo text feature vector has a dimension of [1, 50].

Vectorization Method for Bounding Box

A logoLines object also includes spatial information in the form of a bounding box. Since samples are extracted from images with a wide range of quality, a binning technique (https://en.wikipedia.org/wiki/Data_binning) may be applied to minimize the error without losing too much fidelity. It should be understood that partitions that are too large may result in a loss of fidelity, while partitions that are too small may result in a less than optimal result. The resultant vector has a dimension of [1, 4], and is named the "bounding box feature vector". The bounding box feature vector may be constructed as follows:
1. The bounding box for a logoLines object is first normalized to the global bounding box. This normalization is optional, but may provide better results. For example, the following standard normalization technique x=(0 . . . 1); y=(0 . . . 1) may be used:

normalizedX0=(x0−globalX0)/(globalX1−globalX0)
normalizedY0=(y0−globalY0)/(globalY1−globalY0)
normalizedX1=(x1−globalX0)/(globalX1−globalX0)
normalizedY1=(y1−globalY0)/(globalY1−globalY0)

2. Data binning is then applied independently along the x and y axis given a numeric bin size. In some embodiments, the following formula was used with good results, using a bin size of 0.05:
result=[int(normalizedX0/binSizeX),int(normalizedY0/binSizeY),int(normalizedX1/binSizeX),int(normalizedY1/binSizeY)]

Using the example JSON described above, the bounding box associated with "FinInstName" is vectorized to [0 0 6 1].

Vectorization Method for Combining Logo Text and Bounding Box Feature Vectors

The logo text feature vector may be horizontally stacked with the bounding box feature vector to form the feature vector for the associated logoLines object:
[[logo text feature vector], [bounding box feature vector]].

It should be noted that the feature vector has a dimension of [1, 54]. Using the example JSON described above, the final feature vector is:
[5 17 60 17 68 23 78 1 72 56 0 0 0 0 0 0 0 0 0 0 0 0 0 0 0 0 0 0 0 0 0 0 0 0 0 0 0 0 0 0 0 0 0 0 0 0 0 0 0 0 0 0 6 1]

Vectorization Method for Multiple logoLines Object for a Single Bill Scanned

In some embodiments, due to the manner in which the logo matcher 128 is built, there is a chance that the logoLines array may contain multiple logoLines object. To account for this variation, each logoLines object may be vectorized up to a maximum number n (e.g., n=3) yielding a final feature vector with dimension [1, 54*n]. If the logoLines array have <n elements, the final feature vector is zero padded to yield a vector of dimension [1, 54*n]. Using the example JSON described above and an n value of 3, the "final feature vector" is:
[5 17 60 17 68 23 78 1 72 56 0 0 0 0 0 0 0 0 0 0 0 0 0 0 0 0 0 0 0 0 0 0 0 0 0 0 0 0 0 0 0 0 0 0 0 0 0 0 0 0 0 0 6 1 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0]

It should be noted that the final feature vector has a dimension of [1, 54*3] (or more generally [1, 54*n] for other n values). The n value of 3 was experimentally determined to provide good results.

Feature vectors extracted by the feature vector extractor 1108 may be combined with a label provided by the user (or a known label) to form a training example. The training examples may then be used to train a multi-class classifier. The multi-class classifier may be implemented as a support vector machine, decision tree, naïve Bayes, or a neural network.

In one embodiment, an example of a multi-class classifier is implemented as a neural network with 4 layers:

The input layer with 162 nodes.

Two hidden layers each with 324 nodes, with a (neural network) rectified linear unit (ReLU) activation function.

An output layer with C nodes, where C is the number of classes (i.e., the number of distinct labels). The (neural network) activation function for this layer is softmax.

The neural network may be optimized using stochastic gradient descent (SGD) with a learning rate. For example, the learning rate may be 0.001, decay of $e^{-6}$. In some embodiments, the Nesterov momentum may be applied with a momentum of 0.9 to help with converging. Other hyper-parameters might also work as long as it yields a satisfactory training accuracy and loss rate. For illustrative purposes, the python code snippet below builds the network as described above using the Keras framework:

model=Sequential( )
    model.add(Dense(54*3*2,activation='relu',input_dim=
        54*3))
    model.add(Dense(54*3*2,activation='relu'))
    model.add(Dense(numClasses,activation='softmax'))
    sgd=SGD(lr=0.001,decay=1e-6,momentum=0.9,
        nesterov=True)
    model.compile(loss='categorical_crossentropy',
        optimizer=sgd,
        metrics=['accuracy'])

In some embodiments, the model may be trained over 200 epochs with a batch size of 100 (default for Keras). In some experiments, it was found that these combination of parameters yielded excellent accuracy and minimized training loss, while converging in a reasonable amount of time. Other values for batch size and epochs might be used providing they provide satisfactory results.

To classify scanned bill (i.e., invoice) images using the trained model, the scanned bill may be fed through an OCR engine 112 and its output is turned into a vector in the same manner as for the training samples. The vector is presented to the classifier for classification and a numerical value per class is given to denote the model's confidence that the bill is associated with a particular label (i.e., payee name). Once the multi-class classifier has been trained to satisfaction, it may be introduced back into the automated bill payment system as a matcher as shown in FIG. 12.

Figure 12:
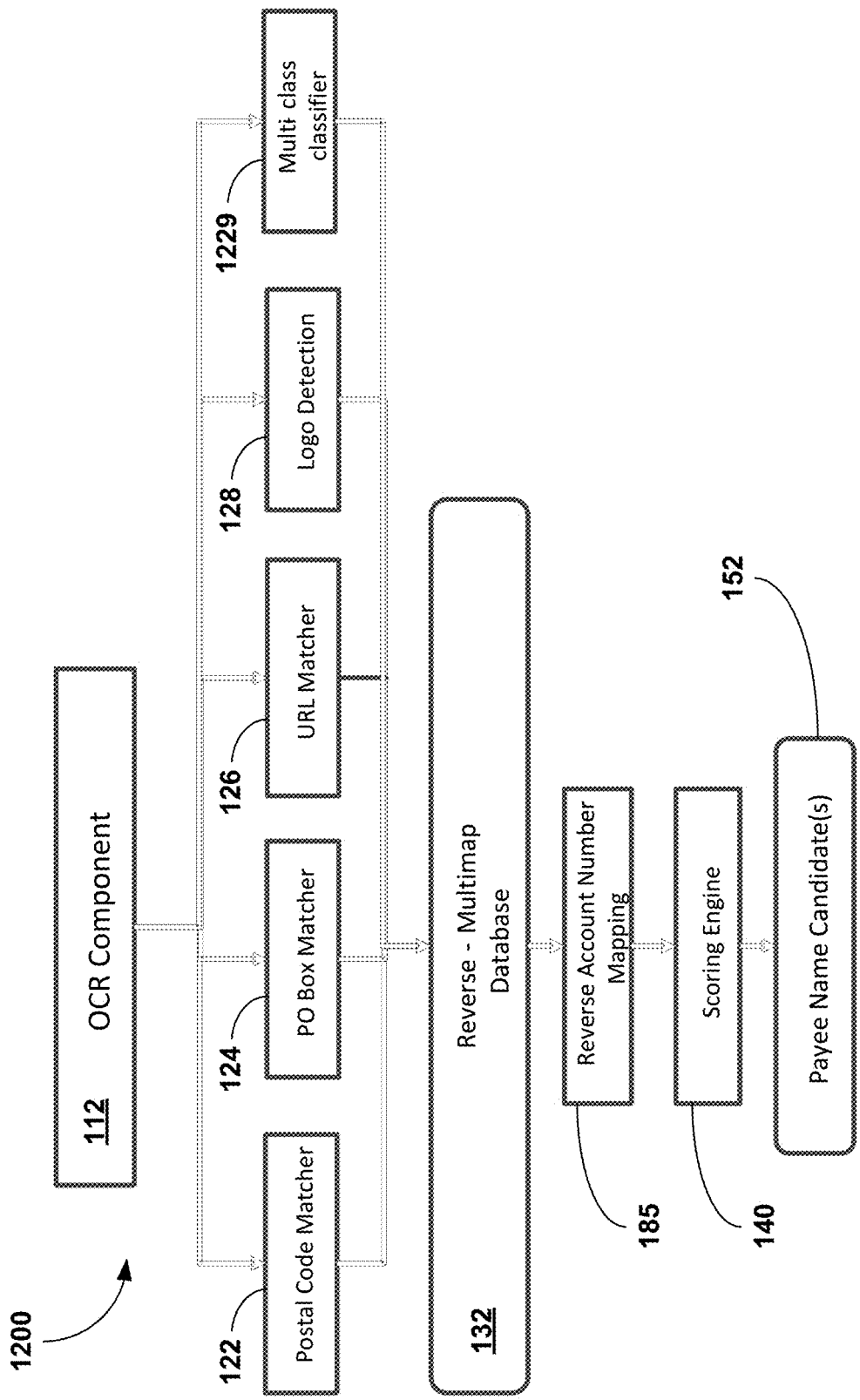
FIG. 12 illustrates, in a component diagram, another example of a payee name detection system, in accordance with some embodiments.

FIG. 12 illustrates, in a component diagram, another example of a payee name detection system 1200, in accordance with some embodiments. The payee name detection system 1200 comprises the components of the payee name detection system 180 and a multi-class classifier 1229. The scoring engine 140 can leverage the classifier's 1229 output in numerous ways. In one embodiment, the score for a particular candidate might be augmented by using the classifier's 1229 confidence value as a multiplier. For example, if the score for FinInstName was 68.70 and the classifier has a 99% confidence rating that the bill shall be classified with the label FinInstName, the score can be augmented by (68.70*(1+0.99−0.5)).

In another embodiment, the classification confidence can be used for tie-breaking. For example, if two payee name candidates have exactly the same score, the one with a higher classification confidence for the same label will be the preferred suggestion. In some embodiments, this can manifest itself as a bump in the score with a constant value (e.g., adding 1 to the score).

Figure 13:
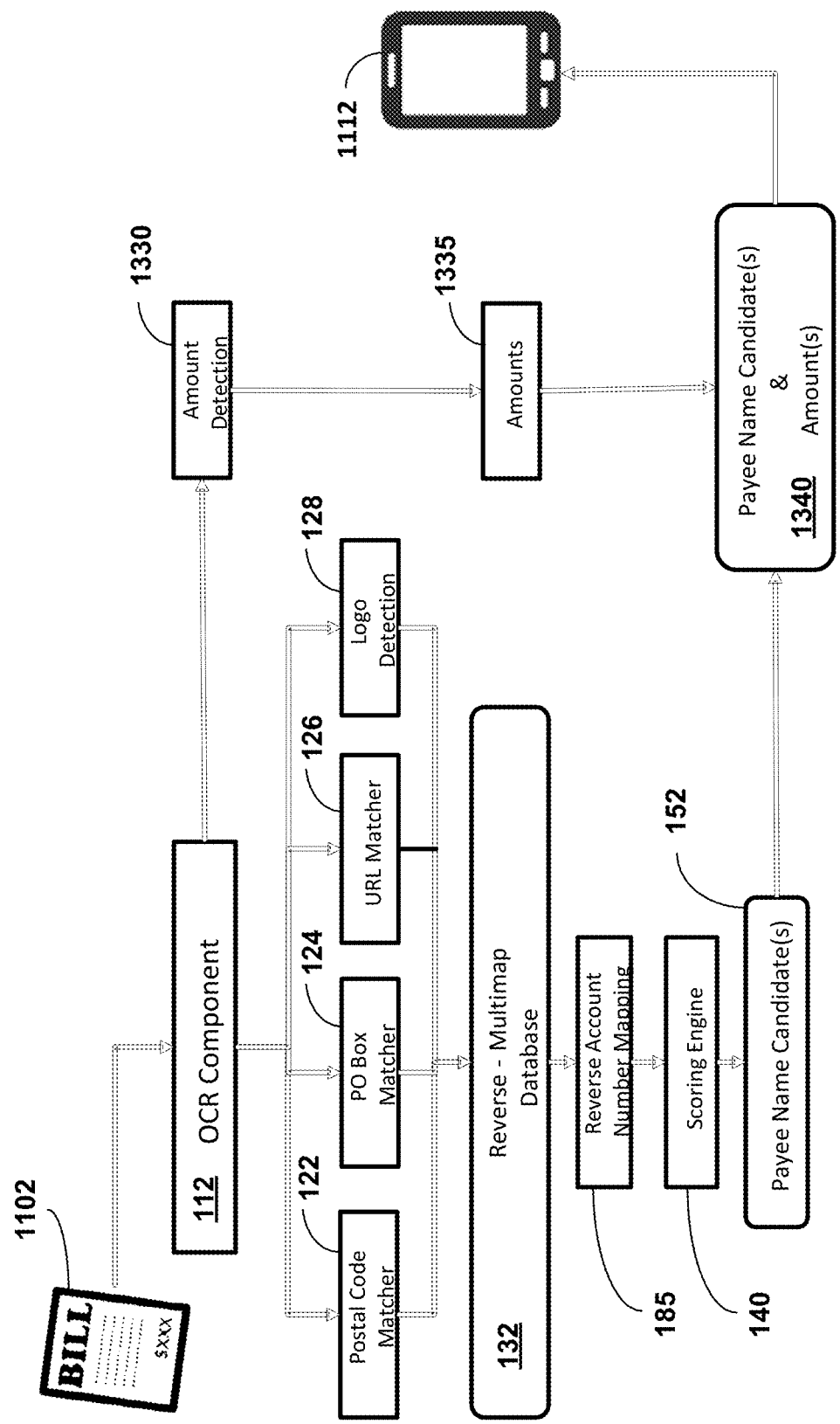
FIG. 13 illustrates, in a component diagram, another example of a payee name detection system, in accordance with some embodiments.

FIG. 13 illustrates, in a component diagram, another example of a payee name detection system 1300, in accordance with some embodiments. The payee name detection system 1300 comprises the components of the payee name detection system 1200 and an amount detection unit 1330. The method used by the amount detection unit 1330 compliments the Bill Payee detection. In some embodiments, the amount detection unit 1330 may be an algorithm for finding an amount value that is likely to be the payment due for the given bill. The amount detection unit 1330 may use the same OCR component 112 to receive input and use features such as bounding boxes and texts to find the likely payment amount. The output of the amount detection (i.e., amount detection unit 1330) may comprise a list of amounts 1335 with a confidence rating and scores. These amounts may be concatenated with the payees for the final output 1340.

Figure 14:
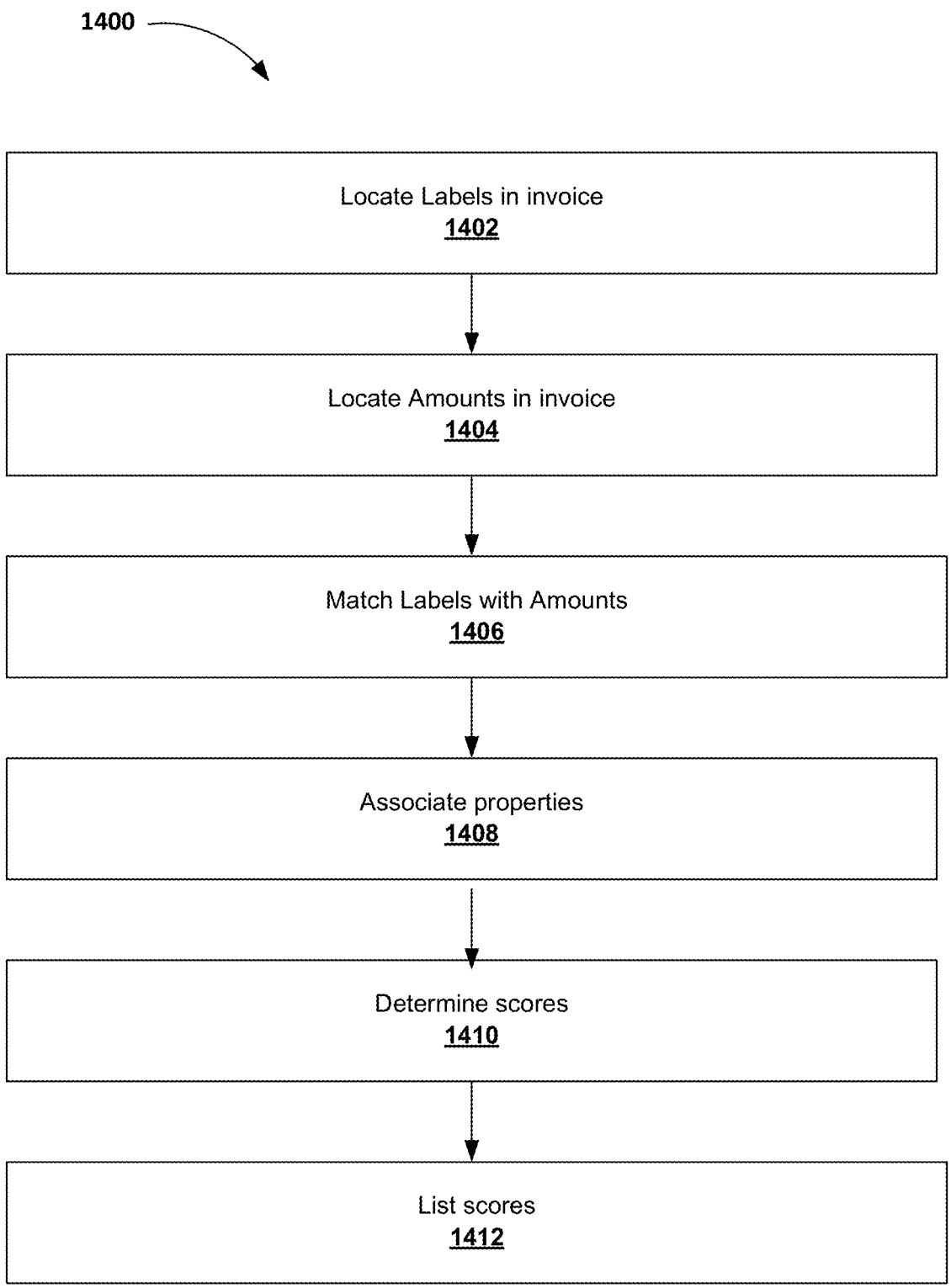
FIG. 14 illustrates, in a flowchart, an example of a method of payment amount detection, in accordance with some embodiments.
Figure 15:
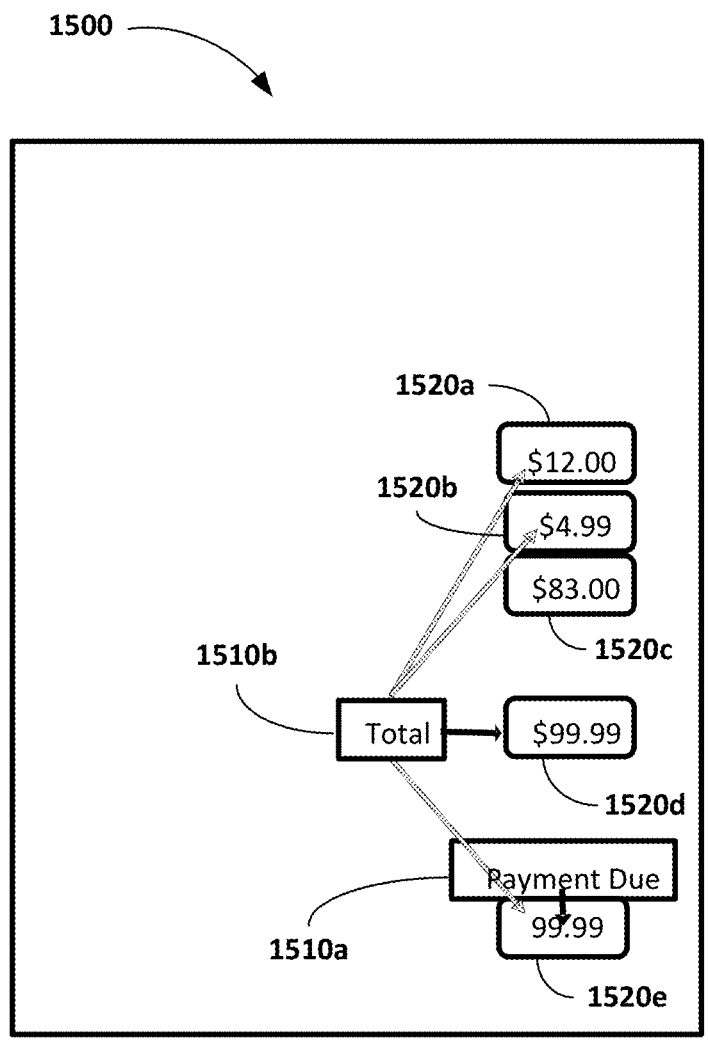
FIG. 15 illustrates an example of an invoice, in accordance with some embodiments.

FIG. 14 illustrates, in a flowchart, an example of a method of payment amount detection 1400, in accordance with some embodiments. FIG. 15 illustrates an example of an invoice 1500 including labels 1510a, 1510b and amounts 1520a to 1520e, in accordance with some embodiments.

The method 1400 comprises locating 1402 all Labels in the bill. Labels can be in one of two label categories: Primary (e.g., 1510a in the example) or Secondary (e.g., 1510b in the example), based on the rank of the importance of the label. It should be understood that there may be embodiments where more than two label categories are used. Two is described for simplicity which could alternatively be considered as "preferred" labels (primary) or "standard" labels (secondary). However, an array of label categories may be used. The label categories represent a relative value associated with the label and the amount. For example, a label "Your Payment Due" may be valued very high as an amount label, whereas "Total" may be valued relatively lower. This is due to the fact that "Your Payment Due" is more indicative of being associated with the correct amount to be located on the bill. This valuation may be extended to include a range of label categories, where higher valued label categories have higher scores. In some embodiments, labels may be pre-determined and/or predicted keywords or phrases, assigned such valuation and stored in a repository accessible by the classifier.

Next, all Amounts are located 1404 in the bill. It should be noted that there can be multiple amounts with the same value (e.g., 99.99 in the example). Also, amounts could have missing dollar signs, which may be defined as a Secondary match (e.g., 1520e in the example) versus an amount with a dollar sign, which may be defined as a Primary match (e.g., 1520a, 1520b, 1520c, 1520d in the example). All labels may then be matched 1406 with an amount. For each label, the optimal matching amount is determined by its amount-to-label association score. In some embodiments, this score may be determined by the maximum of:

If horizontally aligned: $1-|angle(label, amount)|+C$
If vertically aligned: $1/\max(distance(label, amount), 1)^{0.1}+D$
C is either 5 or 3 based on if the label is Primary or Secondary, respectively.
D is either 2 or 1 based on if the label is Primary or Secondary, respectively.

In the example shown in FIG. 15, "Total" will match with the amount "$99.99" because its score is highest.

As defined above, the amount-to-label association score may be determined as a function of an absolute value of an angle associated with the label and the corresponding amount when they are horizontally aligned. When the label and corresponding amount are vertically aligned, the amount-to-label association score may be determined as a function of a distance between the label and the amount. The coefficient C may be assigned a value for each label category. In the example, 5 is assigned to primary label category labels and 3 is assigned to the secondary label category labels. These coefficients, 5 and 3, were determined as yielding good results in experimentation. However, other coefficients may be used.

Once the labels are matched 1406, properties of the amount may associated 1408. For each amount, the properties found by the previous steps may be gathered. It should be noted that for the purpose of associating properties, an amount is considered to be the same for this step whether it was a Primary or a Secondary match. I.e., all versions of "$99.99" or "99.99" are considered to be the same amount. In some embodiments, the properties include amount appropriateness category, count, amount-to-label association and highest amount-to-label association.

An amount appropriateness category property includes all possible categories found for an amount in this bill (i.e., located in step 1404). There are only two amount appropriateness categories in the example of FIG. 15, the amount appropriateness category for each amount would be either Primary or Secondary. For example, "$99.99" may be considered as having two amount appropriateness categories: "Normal" for "$99.99" and "Forgiving" for "99.99". While "$4.99" only has one amount appropriateness category for "$4.99". It is understood that any number of amount appropriateness categories may be used, as in the label categories.

A Count property is the number of times the amount was repeated (regardless of if it was a "Forgiving" or "Normal" amount), as located in step 1404. For example, "$99.99" would have a count of 2, while "$4.99" would have a count of one.

The amount-to-label association property is the number of label matches with a Primary or Secondary label, as found in step 1406. For example, "$99.99" matched "Total", which may be considered to be a secondary label, and "Payment Due", which may be considered to be a primary label.

A highest amount-to-label property is the highest label match score, found in step 1406. This is the maximum score of all label matches with this amount. For example, if "99.99" matched with "Payment Due" and had a score of 2.8, and "$99.99" matched with "Total" and had a score of 3.9, then the highest amount-to-label association property would be 3.9.

Once the properties are associated 1408, then the scores for each amount may be determined 1410. The score may be calculated from the properties found in step 1408. In some embodiments, a scoring formula may be:

Score=Amount Appropriateness Category Score+Count Score+Amount-to-Label Association Score+Highest Amount-to-Label Association Score where, Amount Appropriateness Category Score=Max of ($P_{AAC}$ if Primary Amount Category, $S_{AAC}$ if Secondary Amount category), where $P_{AAC}$ and $S_{AAC}$ are coefficients Count Score=Count−1

Amount-to-Label Association Score=Sum of Amount-to-Label Associations, where each amount-to-label association is given a score of $P_{ALA}$ if the matched label was a Primary label, and $S_{ALA}$ if the matched label was a Secondary label.

Highest Amount-to-Label Association Score=Highest amount-to-label association score An amount appropriateness score modifier may be assigned a value associated to an amount text located on the bill. If a text located on the bill highly represents a monetary amount, for example "$10.00" then that amount should be assigned a higher score than a questionable amount (e.g., "7.54"). As with labels, the higher value associated with an amount, the better the amount appropriateness category in which that amount is placed. In some embodiments, amounts in a primary amount appropriateness category may be assigned a multiplier (i.e., coefficient) of 4, and amounts in a secondary amount appropriateness category may be assigned a multiplier (i.e., coefficient) of 2. These values are selected relative to other possible attributes that may affect the amount's appropriateness category score.

In some embodiments, the ultimate amount value is selected based on the following criteria:
1. An amount that matches multiple labels should generally have a higher score.
2. If an amount is represented multiple times in a bill, it is likely important, but not as important as in criteria 1. above due to it losing context without a label.
3. An amount's proximity or "closeness" to a label, as determined by an amount-to-label association score, is associated with the given label. Thus, increasing the likelihood that the amount is important.
4. How good of a match the amount text was, as determined by what category in which it was placed. This assists with separating amounts from general numbers or other text that can be mistaken for amounts.

Thus, for criteria 1, if multiple labels match, the amount's score will increase by a significant amount. For each criteria 2. to 4., the amount scores increase less significantly than the previous criteria. It should be noted that the values are relative, and can be modified as long as they are scaled together.

In the example shown in FIG. 15, the score for the amount $99.99 may be determined as follows:
Amount Category Score=max(4, 2)=4, where $P_{AAC}$=4 and $S_{AAC}$=2;
Count Score=2 (due to "$99.99" and "99.99")−1=1;
Amount-to-Label Association Score="Payment Due" match (Primary)+"Total" match (secondary)
=4+1=5, where $P_{ALA}$=4 and $S_{ALA}$=1;
Highest Amount-to-Label Association Score=3.9 (determined from steps 1406 and 1408);
Score=Amount Category Score+Count Score+Amount-to-Label Association Score+Highest Amount-to-Label Association Score
=4+1+5+3.9=13.9.

Once the overall or total score is determined 1410, the scores may be listed 1412 into ranges. It should be understood that items in the first range are more important than items in the other ranges of the list. A Head/Tail breaks may be used to rank the list of scores into ranges. In some embodiments, the Head/Tail breaks may use a split coefficient between 0 and 1. Split coefficients greater or equal to 0.3 and less than or equal to 1 may be more effective than split coefficients less than 0.3. Experimentation has shown that a split value of approximately 0.51 was found to be effective. In some embodiments, the amount in the highest range may be used.

After the Head/Tail breaks is performed, if there are multiple amounts that rank very highly, then the confidence that there is a single amount to present to the user is relatively low. On the other hand, if there is only one amount that has a distinctively higher score than the others, then the confidence that this is the correct amount to present to the use is relatively higher.

In the example shown in FIG. 15, the scores from Step 1410 would be:
[$99.99→13.9, $12.00→4, $4.99→4, $83.00→4]
Using Head/Tail breaks, the ranges would be:
1. [$99.99→13.9]
2. [$12.00→4, $4.99→4, $83.00→4]
Since "$99.99" is a distinct higher score than the others, this amount would be recommended for this bill.

Figure 16:
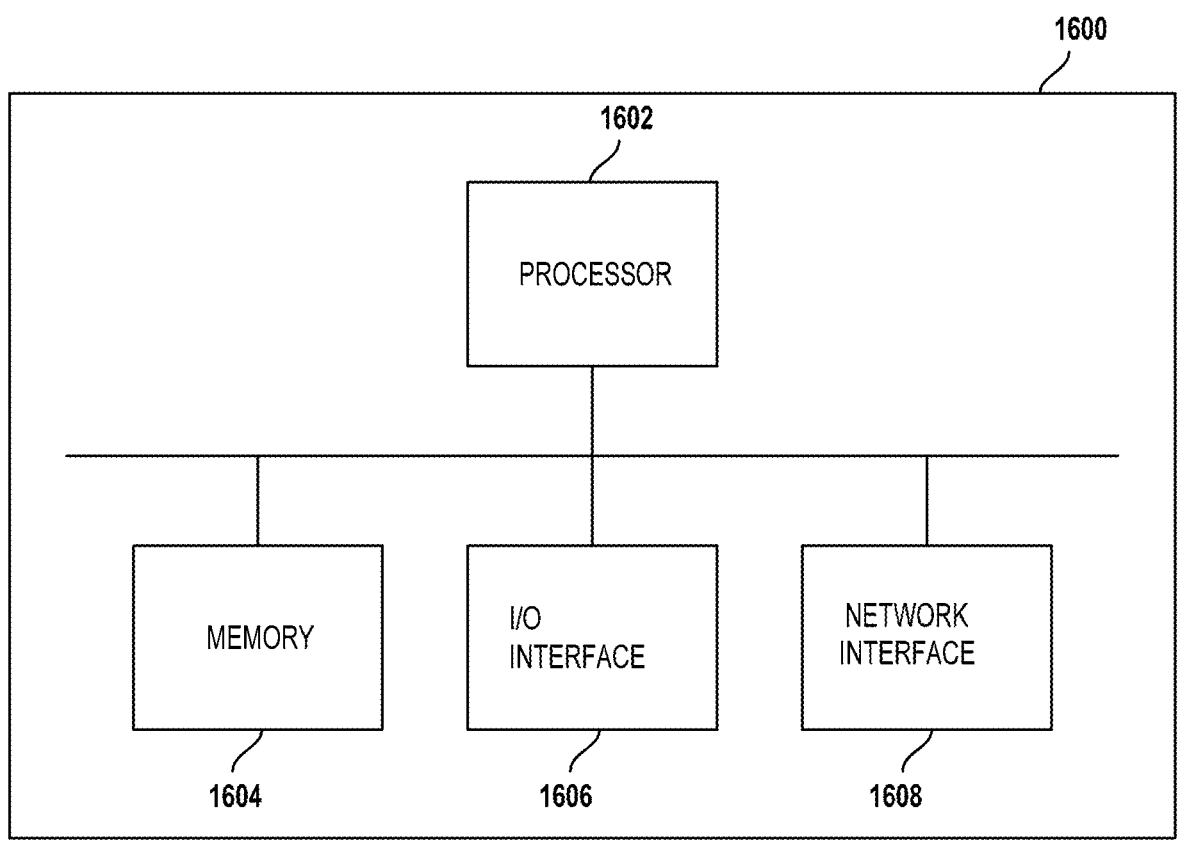
FIG. 16 illustrates, in a block schematic diagram, an example of a computing device, according to some embodiments.

FIG. 16 illustrates, in a block schematic diagram, an example of a computing device 1600, according to some embodiments. There is provided a schematic diagram of computing device 1600, exemplary of an embodiment device that may implement the system and methods described above. As depicted, computing device 1600 includes at least one processor 1602, memory 1604, at least one I/O interface 1606, and at least one network interface 1608.

Each processor 1602 may be a microprocessor or microcontroller, a digital signal processing (DSP) processor, an integrated circuit, a field programmable gate array (FPGA), a reconfigurable processor, a programmable read-only memory (PROM), or any combination thereof. The processor 1602 may be optimized for analyzing text or verbal responses to queries from clients, determining the optimal next query to transmit to users based on previous responses and the totality of information required, and transmitting the optimal next question to the user.

Memory 1604 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 1606 enables computing device 1600 to interconnect with one or more input devices, such as a keyboard, mouse, camera, touch screen and a microphone, or with one or more output devices such as a display screen and a speaker. I/O interface 1106 may also include application programming interfaces (APIs) which are configured to receive data sets in the form of information signals, including verbal communications recorded and digitized, and/or text input from users in response to queries posed to said users.

Each network interface 1608 enables computing device 1600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WMAX), SS7 signaling network, fixed line, local area network, wide area network, and others. Network interface 1608, for example, may be used to communicate audio files (e.g., MP3, WAV, etc.) containing recorded verbal responses from a user device to the system for processing via a speech-to-text engine.

In some embodiments, there is provided a payee name detection system comprising at least one input component, at least one matching service, at least one database, at least one scoring engine and at least one output component. The at least one input component comprises at least one of a scanner, a camera, an optical character recognition (OCR) engine, an image file, or a component that may receive and read the image file. The at least one matching service comprises at least one of a text matching service or a text matching unit. The text matching service comprises at least one of a postal code matcher service, a post office (PO) box matcher service, a uniform resource locator (URL) matcher service, or a logo detection service. The text matching unit comprises at least one of a postal code matcher unit, a post office (PO) box matcher unit, a uniform resource locator (URL) matcher unit, or a logo detection unit. The at least one database comprises a reverse multimap database. The at least one output component comprises at least one of a display a document, or an electronic transmission.

In some embodiments, the payee name detection system may further comprising at least one of a reverse account number mapping service, or a reverse account number mapping unit.

In some embodiments, the logo detection comprises a classification method.

In some embodiments, the logo detection comprises a clustering method.

In some embodiments, the logo detection comprises an unsupervised clustering method.

In some embodiments, the logo detection comprises a k-means clustering method.

In some embodiments, the logo detection comprises a head/tails break clustering method.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for auto-populating an electronic transaction process, the system comprising:
   at least one processor; and a memory storing instructions which when executed by the at least one processor configure the processor to:
   train a multiclass identification model to:
      normalize a label obtained from a digital bill document;
      send a list of potential payee name candidates to be displayed;
      receive a payee name selection from the list of potential payee name candidates; and
      extract a feature vector associated with the normalized label based on the received payee name selection,
   obtain a plurality of scanned payee identifiers from an optical character recognition scan of the digital bill document;
   determine an identifier type for each of the plurality of scanned payee identifiers;
   compare each scanned payee identifier with a corresponding set of stored payee identifiers to obtain at least one first identifier type match, the corresponding set of stored payee identifiers comprising stored payee identifiers of the identifier type for that scanned payee identifier;
   determine an identifier type match score for each of the at least one identifier match;
   determine an overall score based on each identifier type match score;
   select the stored payee identifier associated with a highest overall score; and
   populate an input field associated with the electronic transaction process with the payee identifier.

2. The system as claimed in claim 1, wherein:
   the scanned payee identifier comprises scanned text associated with a payee logo on the digital bill document; and
   the set of stored payee identifiers comprises a set of stored text associated with payee logos.

3. The system as claimed in claim 1, wherein:
   the scanned payee identifier comprises at least one of:
      a scanned payee postal code text on the digital bill document;
      a scanned payee post office box text on the digital bill document;
      a scanned payee uniform resource locator (URL) text on the digital bill document; or
      a scanned text associated with a payee logo on the digital bill document; and
   the set of stored payee identifiers comprises at least one of:
      a set of stored payee postal code text;
      a set of stored payee post office box text;
      a set of stored payee URL text; or
      a set of stored text associated with payee logos.

4. The system as claimed in claim 1, wherein to determine the identifier type match score for one of the at least one identifier type match, the at least one processor is further configured to:
  determine a confidence rating for the identifier type match;
  determine a number of repeated occurrences for the identifier type match, the number of repeated occurrences associated with a reinforcement multiplier; and
  determine the identifier type match score by multiplying the confidence rating by the reinforcement multiplier.

5. The system as claimed in claim 4, wherein to determine the overall score, the at least one processor is further configured to:
  add the identifier type match scores.

6. The system as claimed in claim 5, wherein:
  each identifier type is associated with a type priority rank; and
  the identifier type match score is determined in order of the corresponding type priority rank.

7. The system as claimed in claim 1, wherein the processor is configured to:
  detect one or more labels and one or more amounts on the bill document;
  match the one or more labels with the one or more amounts using a matching score comprising:
    a factor of an angle of the respective label and amount, if the respective label and respective amount are horizontally aligned; or
    a factor of a distance between the respective label and amount, if the respective label and respective amount are vertically aligned;
  associate one or more properties for each amount comprising:
    an amount appropriateness category property comprising a number of amount appropriateness categories for that amount;
    a count property comprising a number of occurrences that amount was repeated in the bill document;
    an amount-to-label association property comprising a number of label matches with a primary or secondary label; and
    a highest amount-to-label association property comprising a highest label match score;
  determine a score for each amount, wherein the score for each amount comprises a summation of an amount appropriateness category score, a count score, an amount-to-label association score and a highest amount-to-label association score;
  rank a list of determined scores by applying a heat/tail break.

8. The system as claimed in claim 7, wherein:
  the factor of an angle of the respective label and amount comprises 1 less |angle(label, amount)|+C;
  the factor of a distance between the respective label and amount is $1/\max(\text{distance}(\text{label}, \text{amount}), 1)^{0.1} + D$;
  if the label is a primary label, C is set to 5 and D is set to 2;
  if the label is a secondary label, C is set to 3 and D is set to 1; and
  the heat/tail break uses a split of 0.51.

9. A method of auto-populating an electronic transaction process, the method comprising:
  training a multiclass identification model, comprising:
    normalizing a label obtained from a digital bill document;
    sending a list of potential payee name candidates to be displayed;
    receiving a payee name selection from the list of potential payee names candidates; and
    extracting a feature vector associated with the normalized label based on the received payee name selection;
  obtaining a plurality of scanned payee identifiers from an optical character recognition scan of the digital bill document;
  determining an identifier type for each of the plurality of scanned payee identifiers;
  comparing each scanned payee identifier with a corresponding set of stored payee identifiers to obtain at least one identifier type match, the corresponding set of stored payee identifiers comprising stored payee identifiers of the identifier type for that scanned payee identifier;
  determining an identifier type match score for each of the at least one identifier type match;
  determining an overall score based on each identifier type match score;
  selecting the stored payee identifier associated with a highest score; and
  populating an input field associated with the electronic transaction process with the payee identifier.

10. The method as claimed in claim 9, wherein:
the scanned payee identifier comprises scanned text associated with a payee logo on the digital bill document; and
the set of stored payee identifiers comprises a set of stored text associated with payee logos.

11. The method as claimed in claim 9, wherein:
the scanned payee identifier comprises at least one of:
  a scanned payee postal code text on the digital bill document;
  a scanned payee post office box text on the digital bill document;
  a scanned payee uniform resource locator (URL) text on the digital bill document; or
  a scanned text associated with a payee logo on the digital bill document; and
the set of stored payee identifiers comprises at least one of:
  a set of stored payee postal code text;
  a set of stored payee post office box text;
  a set of stored payee URL text; or
  a set of stored text associated with payee logos.

12. The method as claimed in claim 9, wherein determining the identifier type match score for one of the at least one identifier type match comprises:
  determining a confidence rating for the identifier type match;
  determining a number of repeated occurrences for the identifier type match, the number of repeated occurrences associated with a reinforcement multiplier; and
  determining the identifier type match score by multiplying the confidence rating by the reinforcement multiplier.

13. The method as claimed in claim 12, wherein determining the overall score comprises:
  adding the identifier type match scores.

14. The method as claimed in claim 13, wherein:
each identifier type is associated with a type priority rank; and
the identifier type match score is determined in order of the corresponding type priority rank.

15. The method as claimed in claim 11, comprising:
detecting one or more labels and one or more amounts on the bill document;
matching the one or more labels with the one or more amounts using a matching score comprising:
- if the respective label and respective amount are horizontally aligned, the matching score is a factor of an angle of the respective label and amount; or
- if the respective label and respective amount are vertically aligned, the matching score is a factor of a distance between the respective label and amount;

associating one or more properties for each amount comprising:
- an amount appropriateness category property comprising a number of amount appropriateness categories for that amount;
- a count property comprising a number of occurrences that amount was repeated in the bill document;
- an amount-to-label association property comprising a number of label matches with a primary or secondary label; and
- a highest amount-to-label association property comprising a highest label match score;

determining a score for each amount, wherein the score for each amount comprises a summation of an amount appropriateness category score, a count score, an amount-to-label association score and a highest amount-to-label association score; and
ranking a list of determined scores by applying a heat/tail break.

16. The method as claimed in claim 15, wherein:
the factor of an angle of the respective label and amount comprises 1 less |angle(label, amount)|+C;
the factor of a distance between the respective label and amount is $1/\max(\text{distance}(\text{label}, \text{amount}), 1)^{0.1}+D$;
if the label is a primary label, C is set to 5 and D is set to 2;
if the label is a secondary label, C is set to 3 and D is set to 1; and
the heat/tail break uses a split of 0.51.

17. A non-transitory computer-readable storage medium comprising computer-executable instructions, which when executed by a processor cause the processor to perform a method of auto-populating an electronic transaction process, the method comprising:
training a multiclass identification model, comprising:
- normalizing a label obtained from a digital, bill document;
- sending a list of potential payee name candidates to be displayed;
- receiving a payee name selection from the list of potential payee names candidates; and
- extracting a feature vector associated with the normalized label based on the received payee name selection;

obtaining a plurality of scanned payee identifiers from an optical character recognition scan of the digital bill document;
determining an identifier type for each of the plurality of scanned payee identifiers;
comparing each scanned payee identifier with a corresponding set of stored payee identifiers to obtain at least one first identifier type match, the corresponding set of stored payee identifiers comprising stored payee identifiers of the identifier type for that scanned payee identifier;
determining an identifier type match score for each of the at least one identifier type match; and
determining an overall score based on each identifier type match score;
selecting the stored payee identifier associated with a highest score; and
populating an input field associated with the electronic transaction process with the payee identifier.

* * * * *